United States Patent [19]

Firey

[11] 4,425,892

[45] Jan. 17, 1984

[54] FURTHER IMPROVED ENGINE INTAKE STRATIFIER FOR CONTINUOUSLY VARIABLE STRATIFIED MIXTURES

[76] Inventor: Joseph C. Firey, P.O. Box 254, Northgate Sta., Seattle, Wash. 98125

[21] Appl. No.: 178,610

[22] Filed: Aug. 15, 1980

Related U.S. Application Data

[63] Continuation-in-part of Ser. No. 69,609, Aug. 24, 1979, abandoned, and a continuation-in-part of Ser. No. 165,233, Aug. 2, 1980, abandoned.

[51] Int. Cl.³ ............................................. F02B 17/00
[52] U.S. Cl. .................................. 123/430; 123/523; 261/89; 261/112
[58] Field of Search ....................... 123/478, 523, 430; 261/89, 112

[56] References Cited

U.S. PATENT DOCUMENTS

| 1,190,540 | 7/1916 | Gettelman | 261/89 |
|---|---|---|---|
| 2,229,313 | 1/1941 | Snyder | 261/89 X |
| 2,306,897 | 12/1942 | Ollig | 123/523 X |
| 2,314,170 | 3/1943 | Snyder | 261/89 X |
| 2,595,719 | 5/1952 | Snyder | 261/89 |
| 2,932,495 | 4/1960 | Olson | 261/89 |
| 4,116,177 | 9/1978 | Whatley, Jr. | 123/478 |

OTHER PUBLICATIONS

SAE Technical Paper No. 820131, "The Axially-Stratified-Charge Engine", by A. A. Quader, Feb. 22-26, 1982.

Primary Examiner—Tony M. Argenbright

[57] ABSTRACT

Means for creating continuously variable stratified air fuel mixtures at the intake of an internal combustion engine are described wherein the air fuel ratio and/or the kinds of fuel molecules vary through the mixture. Compression ignition delay gradients can be created by use of these continuously variable stratified mixtures and in consequence a gradual occurrence of compression ignition can be achieved with great reduction of engine noise and improvements in engine utilization efficiency.

23 Claims, 7 Drawing Figures

FURTHER IMPROVED ENGINE INTAKE STRATIFIER FOR CONTINUOUSLY VARIABLE STRATIFIED MIXTURES

CROSS-REFERENCES TO RELATED APPLICATIONS

This application is a continuation-in-part of my earlier filed U.S. Patent Application entitled, "Engine Intake Stratifier For Continuously Variable Stratified Mixtures," Ser. No. 06/069,609, filing date Aug. 24, 1979, now abandoned, and differs therefrom primarily in additionally encompassing cascaded atomizers and droplet catchers connected in series.

This application is also a continuation-in-part of my earlier filed U.S. Patent Application entitled, "Improved Engine Intake Stratifier For Continuously Variable Stratified Mixtures," Ser. No. 06/165,233, filing date Aug. 2, 1980, now abandoned, and differs therefrom primarily in the mathematical definition of continuously variable stratification.

BACKGROUND OF THE INVENTION

1. Field of the Invention

The field of this invention is internal combustion engines, of both spark ignition and compression ignition type, and particularly such engines utilizing stratified air fuel mixtures at the engine intake manifold and intake valve.

2. Description of the Prior Art

A description of several prior art stratified air fuel mixtures and their use at engine intake is contained in reference A, U.S. Pat. No. 4,147,137, and this descriptive material is incorporated herein by reference thereto. A brief summary of portions of this referenced subject matter particularly relevant to this patent application follows. Three types of intake air fuel mixture stratification are described therein: two barrel carburetor type; injected liquid spray type; multiregional type. Additionally, it is shown therein that stratification created at engine intake survives at least until combustion and that extremely lean air fuel ratio mixtures can be compression ignited. Further, it is shown therein that the noise consequent upon the compression igniting of near stoichiometric air fuel mixture regions can be reduced by making such regions individually of small volume, by scattering such regions about in amongst other kinds of regions, and by arranging that large differences exist in the compression ignition time delay characteristics of those regions which are compression ignited. The engine intake stratifier described and claimed in reference A creates a multiregional stratified air fuel mixture at engine intake by use of a stratifier valve with several separate air fuel mixture creating channels in combination with other elements. An engine intake mixture possessing multiregional stratification consists of many individual regions, each such region being small and essentially of uniform mixture within itself, and adjacent regions differ as to the air fuel ratio or the fuel type or both. The volume of individual regions in the multiregional air fuel mixture can be reduced by increasing the port indexing rate of the stratifier valve and the extent of scattering of one particular type of air fuel mixture region can be increased by increasing the number of active ports and separate air fuel mixture creating channels used by the stratifier valve. Differences in compression ignition time delay characteristics can be made larger by using different kinds of fuels and/or different air fuel mixture ratios as between the several separate air fuel mixture creating channels. In these ways the compression ignition noise level can be reduced when multiregional engine intake stratification is used as described in reference A.

It is a disadvantage of the engine intake stratifier of reference A that to accomplish large reductions of engine noise due to compression ignition requires the stratifier valve to become more complex mechanically, the number of separate air fuel mixing channels to become large, and the number of different fuels and hence fuel tanks to become large, and thus the complexity and cost of the engine system are increased as noise level is reduced.

Many of the beneficial objects made available by use of multiregional intake stratification result from the fact that compression ignition can then be used without excess engine noise. Because compression ignition is intended to occur, higher engine compression ratios are used with consequently increased engine efficiency. Additionally, engine supercharge can be used to reduce engine size, weight and friction power loss. Because very lean and fully evaporated mixtures can be used, the exhaust emissions of undesireable smog-forming materials and of smoke can be reduced as compared to conventional internal combustion engines. These and other beneficial objects made available by use of multiregional stratified engine intake mixtures are described in reference A.

Additional description of prior art stratified air fuel mixtures at engine intake and methods for creating such mixtures are contained in U.S. Pat. No. 4,205,647 and this description of prior art is incorporated herein by reference thereto.

The devices of this invention are used in combination with an internal combustion engine. The term "internal combustion engine" is used herein and in the claims to mean the known combination of elements comprising cylinders, cylinder heads, pistons operative within said cylinders and connected to a crankshaft via connecting rods, valves and valve actuating means or cylinder ports, lubricating system, cooling system ignition system if needed, flywheels, starting system, fuel supply system, fuel-air mixing system, intake pipes and exhaust pipes, torque control system, etc. as necessary for the proper operation of said internal combustion engine. The term "internal combustion engine" is used hereinafter and in the claims to include also the known combination as described above but wherein the cylinders, cylinder heads, pistons operative within said cylinders and connected to a crankshaft via connecting rods, valves and valve actuating means or cylinder ports, are replaced by a rotary engine mechanism combination, comprising a housing with a cavity therein, and plates to enclose the cavity, a rotor operative within said cavity and sealing off separate compartments within said cavity and connecting directly or by gears to an output shaft, ports in said housing for intake and exhaust. The term "internal combustion engine" as used herein includes atmospherically aspirated internal combustion engines as well as supercharged internal combustion engines using turbochargers or other types of intake air compressors. The term "internal combustion engine" is used herein and in the claims to mean internal combustion engines of the spark ignition type, of the compression ignition type and of the type using both spark and compression ignition.

The term, internal combustion engine mechanism, is used hereinafter and in the claims to mean all those portions of an internal combustion engine, as defined hereinabove, except the fuel air mixing system and the torque control system.

REFERENCES

A. U.S. Pat. No. 4,147,137.

B. "Fumigation Kills Smoke—Improves Diesel Performance," Alperstein, Swim, and Schweitzer, SAE Trans. Vol. 66, 1958, pg. 574.

C. "Combustion, Flames and Explosions of Gases," Lewis and Von Elbe, Academic Press, 1961, Chapter 4.

D. "A Fundamentally Based Model of Knock In The Gasoline Engine," Kirsch and Quinn, Sixteenth Symposium (International) On Combustion, The Combustion Institute, page 233, 1977.

E. "Effect Of Antiknocks On Flame Propagation In A Spark Ignition Engine," S. Curry, Ninth Symposium (International) On Combustion, Academic Press, page 1056, 1963.

F. "Shock Waves From Preflame Reactions in a Motored Engine, Firey and Lavy, Combustion and Flame," Vol. 5, No. 1, March 1961, page 27.

G. U.S. Pat. No. 4,205,647

SUMMARY OF THE INVENTION

The devices of this invention are used in combination with an internal combustion engine, as a replacement for the usual fuel air mixing and torque control apparatus, to create continuously variable stratified air fuel vapor mixtures at the engine intake ports. Continuously variable stratified air fuel vapor mixtures are created when, within a device for creating air fuel vapor mixtures for internal combustion engines from engine intake air flow and a moving evaporating liquid fuel, the intake air flows relative to the motion paths of the liquid fuel so that the air fuel vapor mixtures, created by the fractional evaporation of the moving multicomponent liquid fuel into adjacent intake air, change along the motion paths of the moving liquid fuel at least as to the fuel vapor fractions present and change across these liquid fuel motion paths at least as to the ratio of air to fuel vapor. Continuously variable stratification may be complete or regional. Regional continuously variable stratification exists when continuously variable stratification occurs within all fuel containing regions but is discontinuous between regions. Within complete continuously variable stratified mixtures there are no discontinuities of the air fuel mixture. Gradients of the compression ignition time delay can exist within a continuously variable stratified air fuel mixture. The compression ignition process can take place gradually where delay gradients exist and in consequence the engine noise of compression ignition is greatly reduced and this is a principal beneficial object of this invention.

To create the desired continuously variable stratified air fuel vapor mixtures, the devices of this invention comprise means for fractionally evaporating a moving liquid fuel within an enclosed vaporizer section together with means for distributing the engine intake air flow and the liquid fuel flow into the vaporizer section so that the air fuel vapor mixtures created by the fractional evaporation of the moving liquid fuel into adjacent engine intake air change along the motion paths of the moving multicomponent liquid fuel at least as to the fuel fractions present and change across these liquid fuel motion paths at least as to the ratio of air to fuel vapor.

In one preferred form of this invention liquid fuel is supplied to one or more spinning disc atomizers at an offset from the disc spin axis and in pulses with several pulses occurring during each engine intake process. The offset produces an angular fuel flow variation and the pulses produce a time variation of fuel flow. These angular and time variations of fuel flow, combined with the radial fractional evaporation of the multicomponent fuel and the time variation of air flow during the engine intake process, create a continuously variable stratified air fuel vapor mixture at exit from the vaporizer section. If this mixture passes directly into the engine cylinder from the vaporizer section exit, complete continuously variable stratification is used. By interposing separate air fuel mixture channels and a stratifier valve between the vaporizer section exit and the engine intake ports, regional continuously variable stratification can be created by so connecting these channels to the stratifier valve that each region created by the stratifier valve is placed, at stratifier valve exit, adjacent to regions with which it was not adjacent at vaporizer section exit. Still further reductions of the engine noise of compression ignition can be achieved by use of regional continuously variable stratified air fuel vapor mixtures since each compression ignition process can be stopped at regional boundaries. Hence a time and position dispersal of occurrence of compression ignition can be achieved. When this dispersal is combined with the slowing down of the compression ignition process due to delay gradients, large reductions of engine noise occur.

BRIEF DESCRIPTION OF THE DRAWINGS

A cross-sectional view of one preferred form of this invention is shown in FIG. 1, with engine intake air entering at 1, passing through several separate air channels, 8, 9, 10, and air distributor channels, 11, 12, 13, to enter the vaporizer section, 3. Liquid fuel is supplied by the fuel flow controller, 5, to a spinning disc atomizer, 4, which sprays the atomized liquid fuel across the flow of air in the vaporizer section. The air fuel vapor mixtures formed in the vaporizer section, 3, exit via 7 and may pass directly into the engine intake ports.

Figure 3:
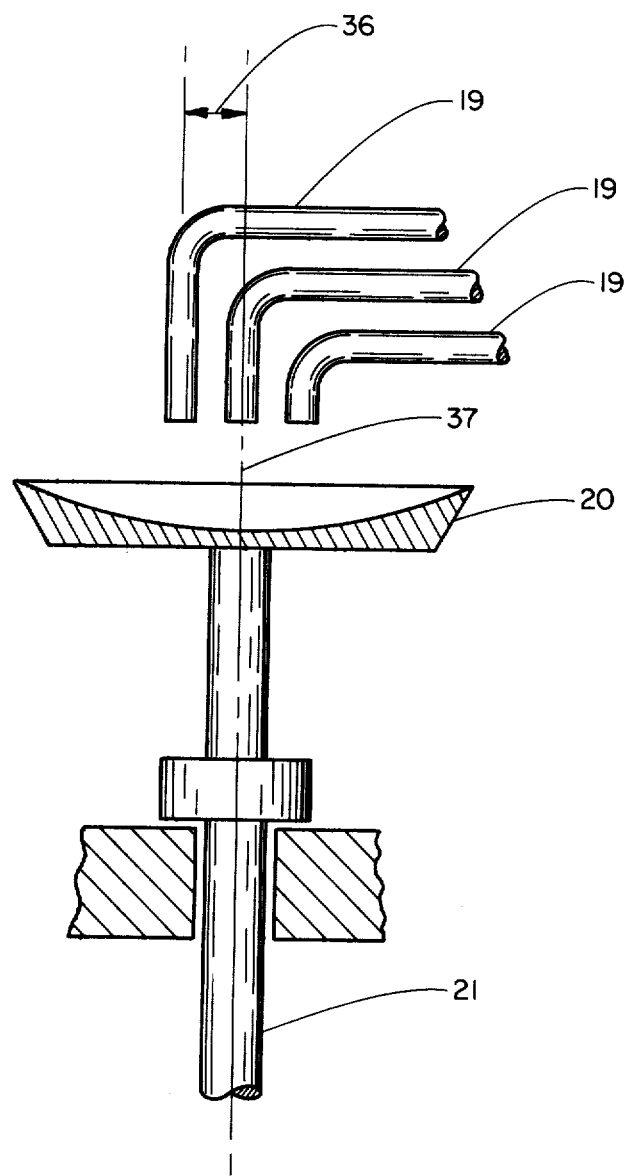

One form of spinning disc atomizer, 4, is shown in FIG. 3, with liquid fuel being supplied to the spinning disc, 20, via fuel feed pipes, 19, which may be offset from the disc spin axis, 37.

Figure 4:
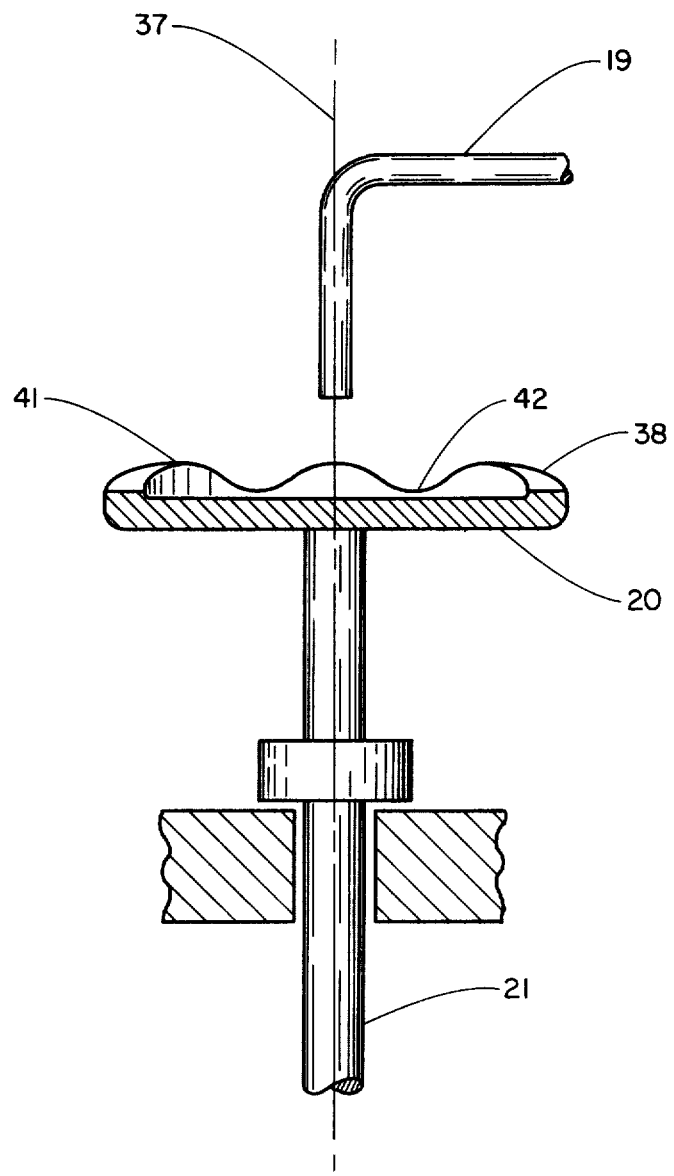

Another form of masked spinning disc, 20, is shown in FIG. 4.

Figure 5:
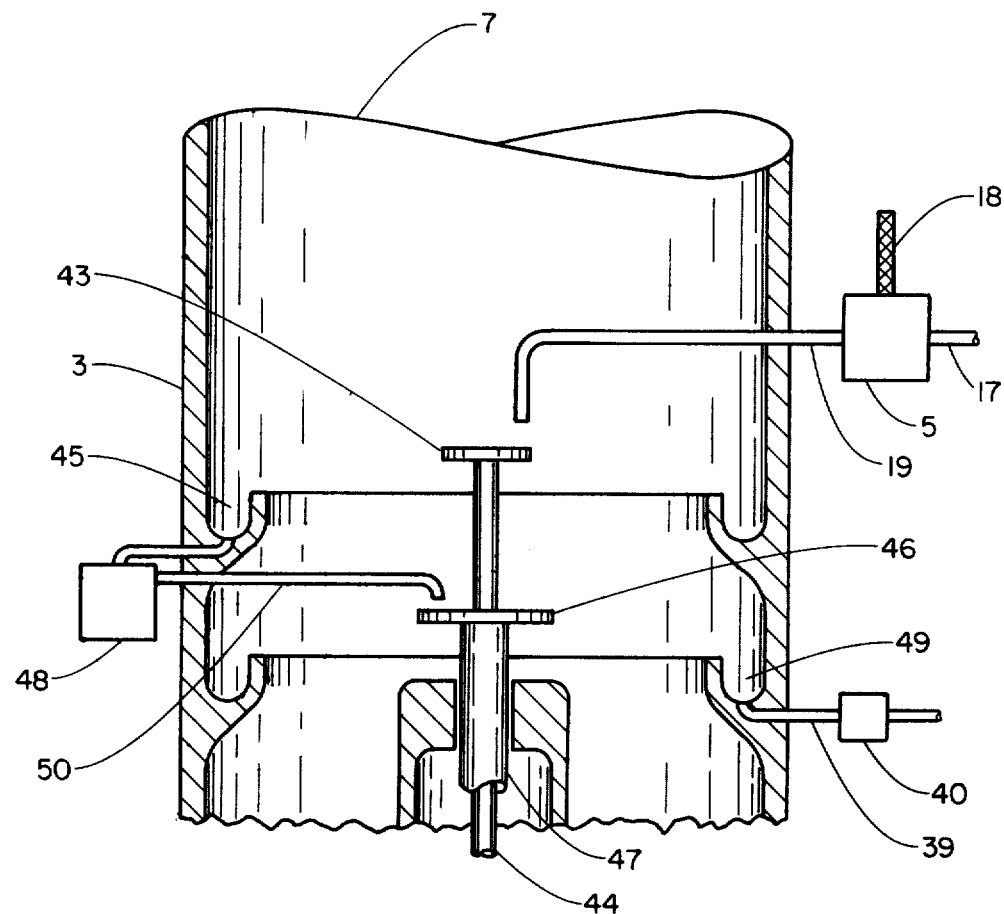

One form of cascaded spinning disc atomizer and droplet catcher is shown in FIG. 5 wherein liquid fuel from the fuel flow controller, 5, is first supplied to a first spinning disc atomizer, 43, and any liquid unevaporated therefrom is caught in a first droplet catcher, 45, to be supplied to a second spinning disc atomizer, 46, by a liquid transfer means, 48.

Figure 6:
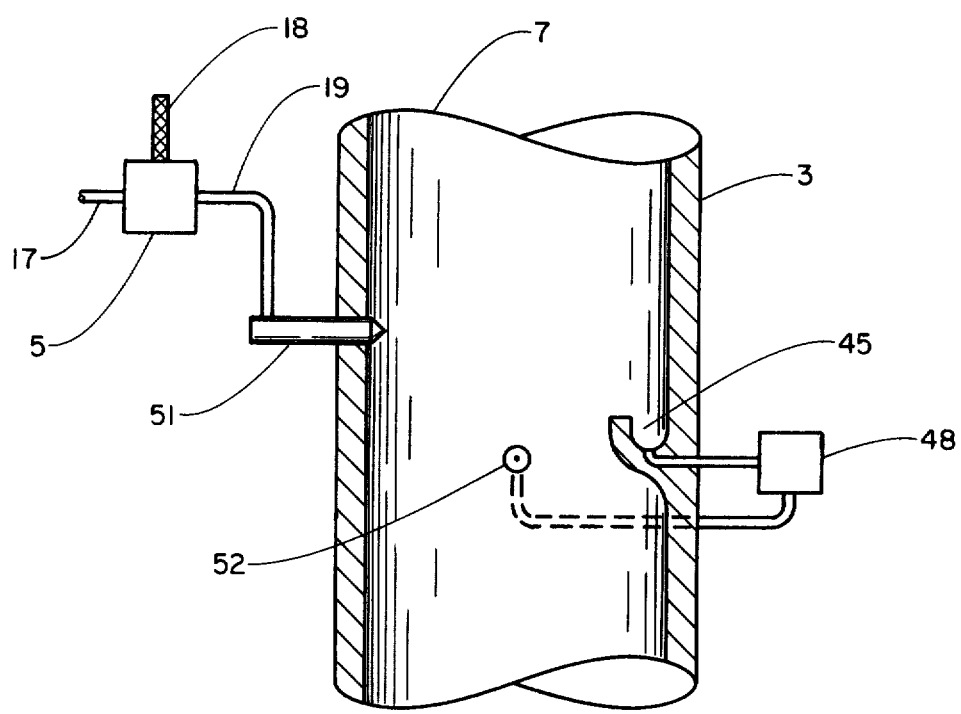

An example of a pressure atomizer and droplet catcher is shown in FIG. 6 wherein liquid fuel from the fuel flow controller, 5, is first supplied to a first pressure atomizer, 51, and any liquid unevaporated therefrom is caught in a first droplet catcher, 45, to be supplied to a second pressure atomizer, 52, by a liquid transfer means, 48.

Figure 7:
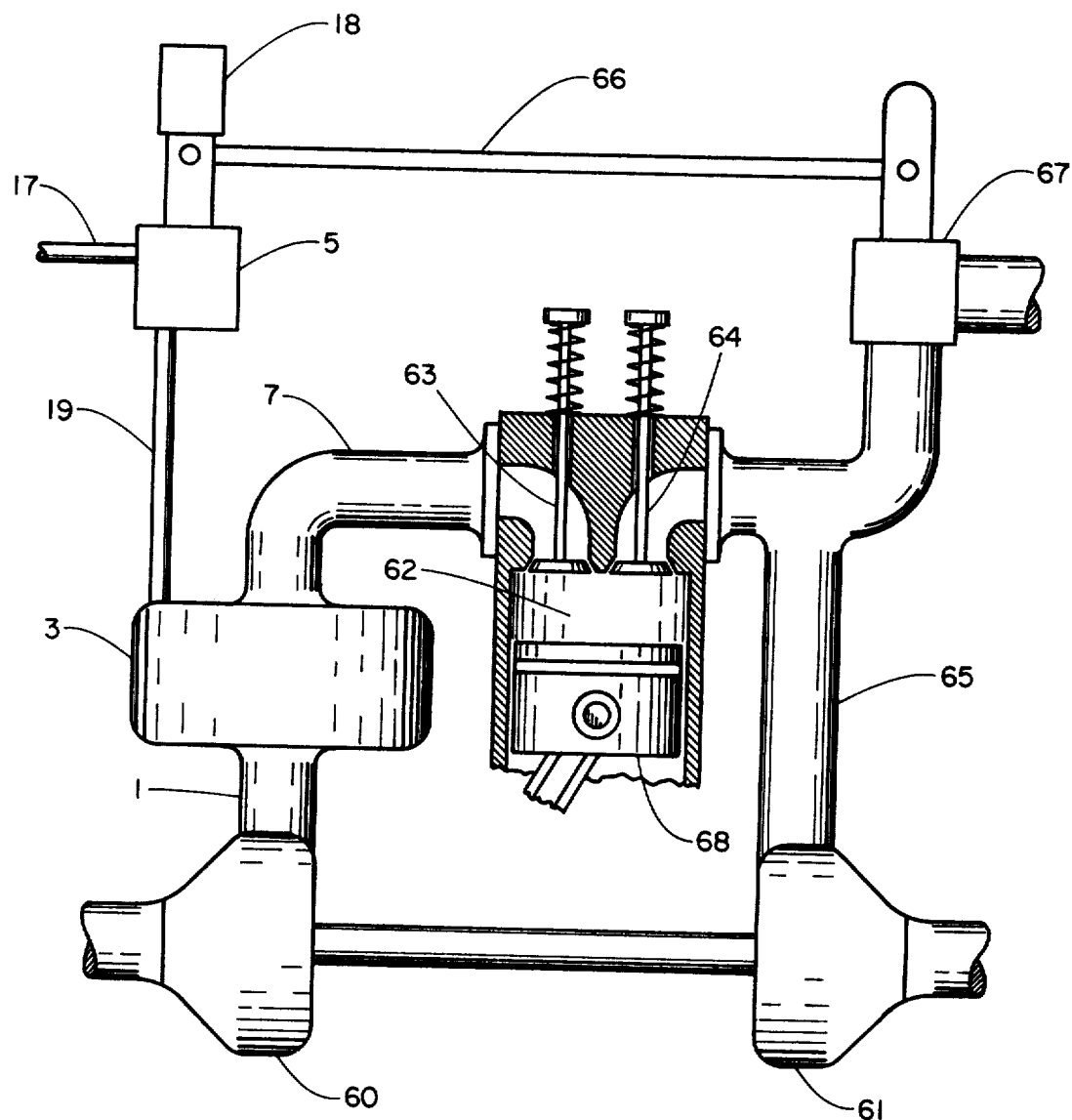

An example of the use of the devices of this invention with an exhaust turbine driven supercharger is shown in FIG. 7.

DESCRIPTION OF THE PREFERRED EMBODIMENTS

The devices of this invention are used in combination with internal combustion engines to create continuously variable stratified engine intake air fuel mixtures. Continuously variable stratification differs from multiregional stratification and from injected liquid spray stratification in that air fuel vapor ratio and/or the kinds of fuel molecules present vary in three dimensions at points throughout a continuously variable stratified mixture. A multiregional stratified mixture contains many differing regions but any one region is a volume of air fuel mixture within which both air fuel ratio and the kinds of fuel molecules present remain essentially the same in all three dimensions. In a similar way continuously variable stratification differs from injected liquid spray stratification as described, for example, in reference B. With these kinds of injected liquid spray stratification, the air fuel mixture formed by evaporation around each liquid droplet is approximately angularly symmetric about the droplet, except for flow distortions of the air-vapor envelope. Hence, within continuous surfaces, everywhere normal to radial lines from the droplet, with due allowances for envelope distortions, both the air fuel ratio and the kinds of fuel molecules present remain essentially the same in the two dimensions of the surface.

Two types of continuously variable stratification may be identified as regional type and complete type. Regional continuously variable stratification exists when the air fuel mixture within each fuel containing region of a multiregional stratified mixture possesses continuously variable stratification. In principle the air fuel ratio and/or the kinds of fuel molecules present vary discontinuously when crossing from one region into another within a multiregional stratified mixture, although some diffusional mixing may occur across this nominal discontinuity. Complete continuously variable stratification exists when there are no such nominally discontinuous variations of mixture composition throughout all fuel containing portions of an entire engine cylinder charge.

Reduced engine noise due to compression ignition is a principal beneficial object made available by the devices of this invention. As discussed in reference A, compression ignition of air fuel mixtures occurs abruptly following a time delay interval and pressure waves are generated whose strength is proportional to the volume of air fuel mixture thus abruptly ignited. The engine noise of compression ignition results from these pressure waves and hence the engine noise is also proportional to the volume of air fuel mixture abruptly compression ignited. With multiregional stratification the noise of compression ignition can be reduced by reducing the volume of the individual regions and by creating differences in the compression ignition time delay between regions as described in reference A.

With continuously variable stratification the compression ignition time delay can also be made to vary continuously. The compression ignition time delay varies with the kinds of fuel molecules present as well as with the air fuel ratio. Air fuel mixtures that are stoichiometric or leaner in fuel content most commonly show increased compression ignition time delay with increasing air fuel ratio. The effects of the kinds of fuel molecules upon the compression ignition time delay are complex and can be very large. For example, pure benzene $C_6H_6$, appears to have an almost infinite compression ignition time delay whereas normal hexane, $C_6H_{14}$, has a very short compression ignition time delay. Additive fuel molecules, such as aromatic amines and organic peroxides, also greatly affect the compression ignition time delay as is well known in the art. The term delay gradient is here defined as the distance rate of change of compression ignition time delay along a line within an air fuel mixture. The delay gradients at any particular point in an air fuel mixture are a composite of the effects on compression ignition time delay of both the local variation of air fuel ratio and the local variation of kinds of fuel molecules present.

Within a continuously variable stratified air fuel mixture delay gradients can be created in three dimensions within the fuel containing portions of the mixture since the air fuel ratio and/or the kinds of fuel molecules present vary in three dimensions.

That compression ignition can take place in a gradual manner in the presence of a delay gradient can be seen by examining the known details and current theories of the compression ignition process of hydrocarbon fuels. Compression ignition takes place via a chain branching reaction between fuel and oxygen wherein reaction is carried onward by chain carriers, usually free radicals. Chain branching via creation of extra chain carriers, and hence reaction speed up, awaits the accumulation of some unknown chain branching intermediate, perhaps peroxide molecule, which is itself a product of the chain reaction. The compression ignition delay is thus the time needed to accumulate enough of this branching intermediate so that chain branching and reaction speed up can occur. Hence the concentration of chain carriers in a fuel air mixture remains low until the compression ignition time delay has almost expired since only then are large numbers of chain carriers being created via the branching intermediate. Once adequate branching commences chain carriers concentrations rise rapidly and the overall reaction accelerates rapidly and this speed up is compression ignition. Details of this hydrocarbon and oxygen chain branching reaction are presented in reference C and there is general agreement about these chemical characteristics of compression ignition even though many reaction details remain obscure.

Controvery, however, surrounds the description of the compression ignition process details following expiration of the delay period. According to the autoignition theory, as described for example in reference D, noisy compression ignition, such as knock, occurs only when the branching intermediate accumulates uniformly and thus the compression ignition delay expires essentially simultaneously throughout an appreciable volume of air fuel mixture. With a delay gradient the branching intermediate accumulates non-uniformly and ignition delay expires at different times in different places and the consequent autoignition must proceed gradually from one region to the next only as the ignition delay expires in each succeeding region, according to this autoignition theory.

According to the flame acceleration theory, as described for example in reference E, noisy compression ignition, such as knock, occurs when a slow moving normal flame meets a volume of air fuel mixture containing sufficient of the branching intermediate that compression ignition delay is about to expire throughout this volume. Since the normal flame is moved forward, at least in part, via the forward diffusion of chain carriers, a large speed up of the flame might well occur in a volume which was already generating chain carriers in large numbers via the branching intermediate, and this flame speed up is considered to be knock, or compression ignition, according to this theory. When, however, a slow moving normal flame enters a delay gradient, such flame speed up cannot occur since the needed amount of the branching intermediate can exist only in at most a very small volume. Hence such a normal flame would advance only slowly through an air fuel mixture possessing a delay gradient, according to this flame acceleration theory.

According to the detonation wave theory, as described for example in reference F, the reaction acceleration consequence upon expiration of the ignition delay within one region generates shock waves emanating from this first reaction region and these shock waves can become detonation waves provided the shock compressed air fuel mixture immediately behind the wave front can also accelerate its own reaction sufficiently to reinforce the shock wave. If a detonation wave is thusly created, the compression ignition will be noisy according to this theory. The shock wave compressed air fuel mixture can only thusly accelerate its own reaction and create a detonation if the amount of the needed branching intermediate is already nearly adequate for expiration of the compression ignition delay. Though shock compression can speed up a reaction, it cannot appreciably increase the amount of the needed branching intermediate within the very short time of wave passage. Within an air fuel mixture possessing a delay gradient the initial shock wave creating reaction occurs in the region whose ignition delay interval first expires. In all adjacent regions the amount of branching intermediate is necessarily inadequate for expiration of the delay interval and hence is also inadequate for the reaction acceleration within the shock wave compressed material needed to create a detonation wave. A detonation wave and the consequent engine noise are thus not created when delay gradients exist, according to this detonation wave theory.

We thus see that gradual and reasonably quiet occurrence of compression ignition will take place in air fuel mixtures possessing a delay gradient, according to each of the existing theories of compression ignition.

It is in this way that the devices of this invention can be used to reduce the engine noise of compression ignition, by creating delay gradients throughout the ignitable air fuel mixture and by making these delay gradients large.

Where nominally discontinuous delay gradients exist, as in a multiregional stratified air fuel mixture, the compression ignition process within a region will stop at these boundaries and recommence later in adjacent regions only when their compression ignition time delay has expired. In this way each region in a multiregional stratified air fuel mixture compression ignites at a time different from other regions and this time and position dispersed occurrence of compression ignition reduces the noise by scattering whatever pressure waves result and by spreading out the duration of pressure wave creation. Hence, further reduction of engine noise due to compression ignition can be achieved by combining multiregional stratification with continuously variable stratification within each fuel containing region thereof to create regional continuously variable stratification.

The devices of this invention are used in combination with an internal combustion engine, and replace the conventional torque control and air fuel mixing equipment of the internal combustion engine, and connect to the air intake port of the engine. The devices of this invention can be used in combination with internal combustion engines of the spark ignition type, of the compression ignition type, and of the type using both spark and compression ignition.

The devices of this invention differ from those described in U.S. Pat. No. 4,205,647 principally in that the air fuel mixtures created in the vaporizer section vary not only along the liquid fuel motion paths but also across the liquid fuel motion paths. In consequence the devices of this invention create continuously variable stratified air fuel mixtures at engine intake which the devices of the referenced patent did not accomplish. With a continuously variable stratified mixture a stratifier valve is no longer necessary and several forms of this invention differ further from the referenced patent in not having a stratifier valve element after the vaporizer section.

Figure 1:
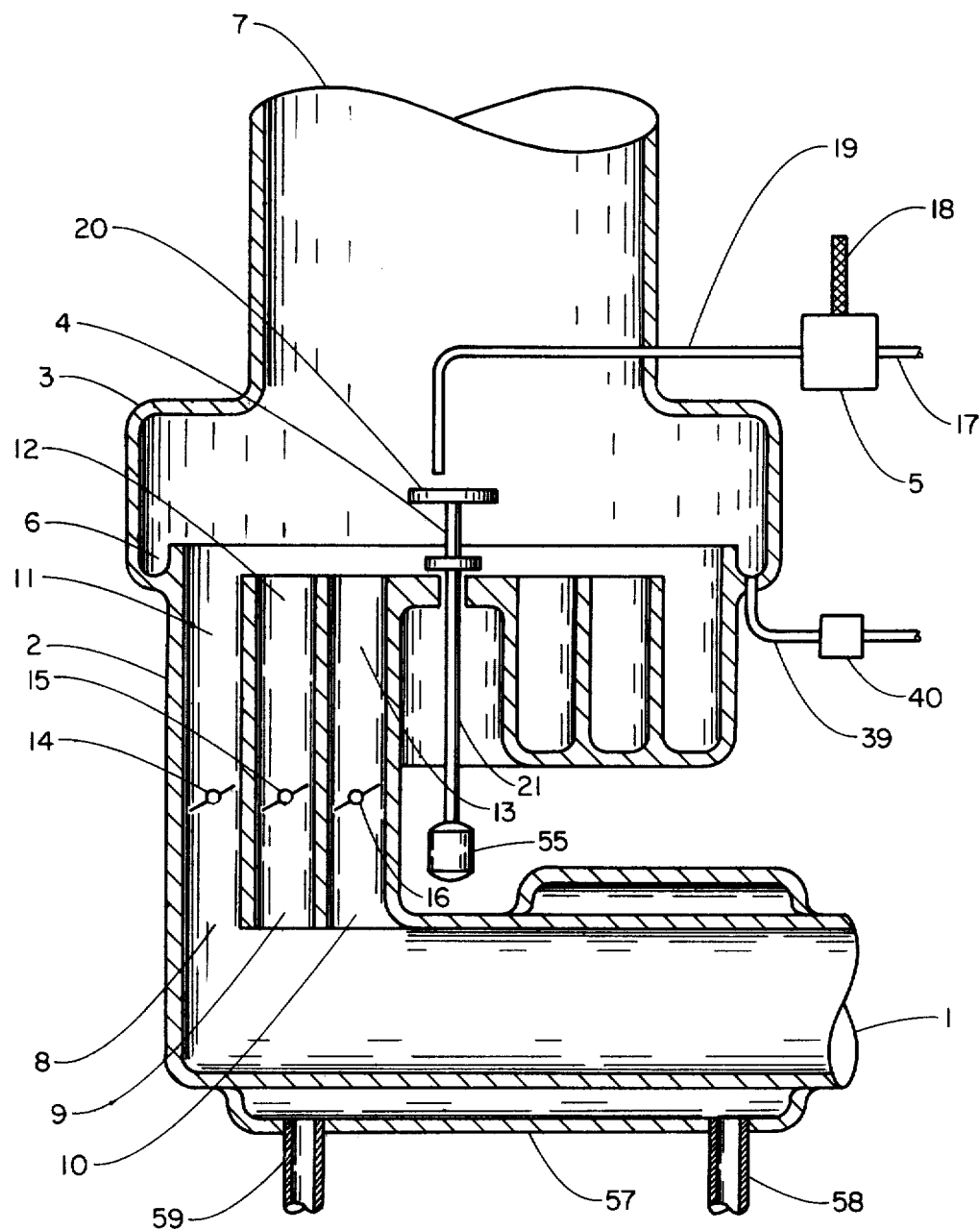

One particular preferred form of this invention is shown in FIG. 1 and comprises: an air intake, 1; an air distributor means, 2; a vaporizer section, 3, comprising a spinning disc atomizer, 4, a liquid fuel flow controller means, 5, and a droplet catcher, 6; the vaporizer section outlet, 7, connects to the engine intake air ports. The devices of this invention are preferably used with turbocharged internal combustion engines. A turbocharger comprises a compressor, to increase the pressure of air supplied to the engine, driven by a gas turbine driven in turn by the engine exhaust gas and an engine so equipped is herein referred to as turbocharged internal combustion engine. Other types of superchargers or engines with no supercharger can also be used with the devices of this invention. Compressed air from the compressor of the turbocharger enters the air intake, 1, and passes into the several separate air channels 8, 9, 10. The air inlet distributor, 2, contains distributor channels, 11, 12, 13, each connecting separately to but one of the separate air channels, 8, 9, 10, so that the air flows from the separate air channels through the air inlet distributor channels and enters the vaporizer section, 3, in an essentially angularly uniform flow but with an adjustable radiation variation of air flow. Only three separate air channels, 8, 9, 10, and the three distributor channels, 11, 12, 13, connected thereto are shown in FIG. 1 to avoid undue complexity of the drawing, but only one or any number of separate air channels and connected distributor channels can be used. The relative volumes of air flowing separately in the separate air channels, 8, 9, 10, and connected distibutor channels, 11, 12, 13, can be adjusted by adjusting the flow restricting dampers or valves, 14, 15, 16, in order to adapt the engine to a particular fuel and assure full evaporation of all the liquid fuel admitted to the vaporizer section, 3.

Liquid fuel from the fuel tank and supply system enters the fuel flow controller, 5, via the pipe, 17. The torque control lever, 18, controls the quantity of liquid fuel per engine revolution passed by the fuel flow controller, 5, via the pipe, 19, onto the spinning disc, 20, of the spinning disc atomizer, 4. The torque control lever, 18, can be moved either by the engine operator, if hand or foot control of engine torque is desired, or by the engine governor if governor control of engine torque is desired. The fuel flow controller, 5, supplies the liquid fuel to the spinning disc in a series of pulses, there being at least two, and preferably more than two, such fuel flow pulses for each engine air intake process. Each such fuel flow pulse constitutes a cycle of increasing fuel flow rate and then decreasing fuel flow rate. The fuel flow controller, 5, can be any of the devices or means for supplying a liquid fuel in pulses and controlling the amount of liquid supplied per engine intake process as are already well known in the art of liquid fuel pumps and controllers. For example a positive displacement pump driven at some integral multiple of engine RPM and with adjustable displacement could be used as the fuel flow controller, 5, and the torque control lever, 18, would then adjust the pump displacement. Other types of fuel flow controllers can also be used as for example, a piezoelectric pump whose frequency is set by an alternator connected to the engine crankshaft.

Liquid fuel flows from the pipe, 19, on to the spinning disc, 20, of the spinning disc atomizer, 4, preferably offset from the center of rotation of the disc. The liquid fuel on the spinning disc is speeded up to very nearly the same speed as the disc and the resultant centrifugal force causes the liquid fuel to move outward radially on the disc and to be progressively speeded up to the higher disc speeds prevailing at greater disc radius. Finally the liquid fuel is thrown off the edge of the spinning disc with a tangential component of velocity very nearly equal to the speed of the outer edge of the disc and also with a radial component of velocity. The liquid fuel leaving the spinning disc is quickly atomized into tiny droplets partly by the spreading of the liquid sheet as radius increases and partly by the aerodynamic forces acting on the liquid due to its high velocity relative to the adjacent air. The spinning disc, 20, is rotated at high speed by any suitable drive means, such as by an electric motor 55 or by gears or belts from the engine crankshaft, via the disc drive shaft, 21. We want to thusly atomize the liquid fuel within the vaporizer section, 3, in order to increase the area of contact between the liquid fuel and the heated intake air so that sufficient heat can be transferred from the heated air into the liquid fuel to evaporate the liquid completely before the droplets reach the outermost radius of the vaporizer section, 3. The higher the speed of the outer edge of the spinning disc the smaller becomes the average liquid droplet size and the greater becomes the area available to transfer heat from the heated air into the liquid droplet as well known in the art of spinning disc atomizers.

The spinning disc type of liquid atomizer is particularly well suited for this invention since the small flow volume of liquid fuel can be easily metered at low pressures but fine atomization can nonetheless be secured at the high velocities of the spinning disc.

Within the vaporizer section, 3, heat transfers from the heated air into the atomized liquid droplets causing fuel to evaporate into the adjacent air and air fuel vapor mixtures are thusly created within the vaporizer section. As a fuel droplet travels along its trajectory from the edge of the spinning disc, 20, toward the outer surface of the vaporizer section, those fuel molecules of higher vapor pressure will at first evaporate more rapidly than those of low vapor pressure and thus the air-fuel vapor mixtures formed close to the spinning disc will be richer in high vapor pressure molecules and leaner in low vapor pressure molecules. By the time a liquid fuel droplet reaches the outer radii of the vaporizer section, 3, it is largely depleted of high vapor pressure molecules and hence the low vapor pressure molecules evaporate here into the adjacent air and these air-fuel vapor mixtures will be richer in low vapor pressure molecules and leaner in high vapor pressure molecules. In consequence the fuel is fractionated within the vaporizer section, 3, the average vapor pressure of the evaporated fuel fractions decreasing progressively with increasing radius away from the spinning disc, 20. Also in consequence the compression ignition time delay characteristics of the air-fuel vapor mixtures can also vary along a radius of the vaporizer section since different proportions of differing fuel molecules are located in the air-fuel vapor mixtures formed by different fuel fractions evaporating at different positions along the droplet motion paths.

The ratio of air to fuel vapor of the air-fuel vapor mixtures formed within the fractionator may also vary along a radius of the vaporizer. This variation of air-fuel vapor ratio along a radius of the vaporizer. This variation of air-fuel vapor ratio along a vaporizer radius can be controlled as desired by design or control of one or more of the following: the distribution of air flow from the several separate air channels, 8, 9, 10, into the vaporizer section, 3, at different radii therein; the distribution of air temperatures between the air flows in these several separate air channels; the distribution of different kinds of fuel molecules and hence of different fuel vapor pressures within the original liquid fuel supplied by the fuel flow controller, 5, to the spinning disc atomizer, 4; the extent of radial inflow of mixture due to differences between the diameter of the vaporizer section, 3, and the diameter of the vaporizer section outlet, 7. With these four independent controls available almost any desired variation of air-fuel vapor ratio along radius within the vaporizer section can be achieved. In these ways a radial delay gradient may be created within the air fuel vapor mixtures generated within the vaporizer section, 3, partly by the radial variation in the kinds of fuel vapor molecules and partly by the radial variation in air fuel vapor ratio.

With the fuel supply pipe, 19, offset from the center of rotation of the spinning disc, 20, the liquid fuel pulses are placed upon the disc with angular non-symmetry and hence will leave the outer edge of the spinning disc also with angular non-symmetry. With the air flow essentially angularly uniform through the vaporizer section, 3, this angular non-symmetry of the liquid fuel flow creates angular gradients of air fuel vapor ratio within the vaporizer section, 3. Hence an angular delay gradient due to the air fuel ratio gradient may also be created within the air fuel vapor mixtures generated within the vaporizer section, 3.

Preferably each vaporizer section, 3, connects at its outlet, 7, to the intake ports of those four engine cylinders of a four stroke cycle internal combustion engine whose four separate intake processes occur principally during four separate and consecutive half revolutions of the engine crankshaft. In this preferred way the engine intake air flows through the vaporizer section, 3, in pulses of increasing air flow rate followed by decreasing air flow rate. Since at least two pulses of fuel flow will preferably be made by the fuel flow controller, 5, into each such air flow pulse, the air fuel vapor mixtures generated within the vaporizer section will vary with time. In this way an air fuel vapor ratio gradient, and hence also a delay gradient, is created along the direction of flow of the air fuel mixture flowing out of the vaporizer section, 3.

For two stroke cycle engines, and for four stroke cycle engines in general, the above described air fuel vapor ratio gradient along the mixture flow direction can be created by connecting each vaporizer section to at least one and preferably a plurality of engine cylinders whose number and relative cyclic timing create a time varying flow of intake air through the vaporizer section. In those engines where the air flow stops for a time, as for example in single cylinder engines, the flow of liquid fuel is also concurrently stopped in order to assure that air flow is available to evaporate the liquid fuel supplied. To avoid torque output variations between cylinders of a multicylinder engine, the liquid fuel flow pulses are timed to occur equally into each air flow pulse of each engine intake process. This preferred phase relation between air flow and fuel flow can be most easily secured by driving the pulses of the fuel flow controller, 5, at some integral multiple of engine crankshaft RPM, as by a positive geared drive or by setting the frequency of a piezoelectric fuel pump with a crankshaft driven alternator.

We thus see that the form of this invention shown in FIG. 1 and described herein above creates air fuel vapor mixtures which change along the length of the motion paths of the moving multicomponent liquid fuel at least as to the kinds of fuel molecules present and also change across the several motion paths of the moving liquid fuel at least as to the ratio of air to fuel. This air fuel vapor mixture at outlet of the vaporizer section, 3, and hence at inlet to the engine cylinder, is thus a continuously variable stratified air fuel vapor mixture wherein the air fuel ratio, or the kinds of fuel molecules present, or both, vary in three dimensions. The device shown in FIG. 1 creates complete continuously variable stratification since no nominally discontinuous variations of mixture composition occur therein.

To achieve the beneficial object of reduced engine noise made available by the devices of this invention they are to be so utilized that delay gradients exist in three dimensions. Wherever only air fuel vapor ratio gradients exist, the desired delay gradient also exists since all hydrocarbon fuels exhibit a change of compression ignition time delay characteristic when air fuel ratio changes. Wherever only a gradient of the kinds of fuel molecules present exists, a delay gradient can be obtained by so selecting the original fuel components in the tank fuel that their compression ignition time delay characteristics vary with vapor pressure. Where both an air fuel vapor ratio gradient and a kinds of fuel molecules present gradient exist together, as for example along the liquid fuel motion paths in the vaporizer section, a delay gradient can be obtained by adjusting the fuel composition and/or by adjusting the air fuel vapor ratio gradient so that the delay gradient effect of the kinds of fuel molecules present gradient is not offset by the delay gradient effect of the air fuel vapor ratio gradient.

Figure 2:
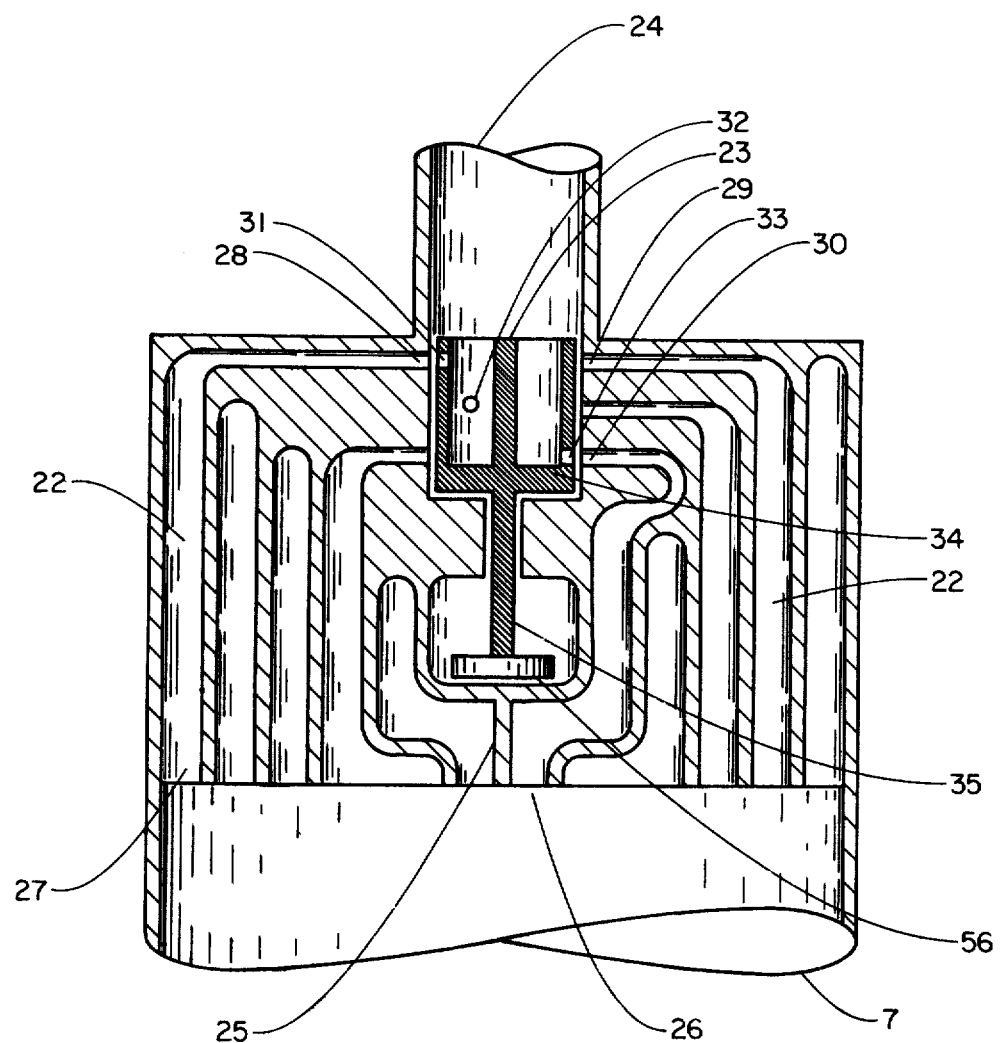
In FIG. 2 are shown in cross section the several separate air fuel mixture channels, 22, and the stratifier valve, 23, which are interposed between the vaporizer section exit, 7, of FIG. 1, and the engine intake ports when regional continuously variable stratified air fuel mixtures are to be used in the engine.

Control of the engine torque, and hence power, can be secured by arranging that the torque control lever, 18, controls the total flow of fuel per engine cycle supplied by the fuel flow controller, 5, via the pipe, 19, to the spinning disc, 20, of the spinning disc atomizer, 4. Where positive displacement mechanical or piezoelectric fuel pumps are used, the pump displacement per stroke can be adjusted or the fuel flow pulse frequency can be adjusted by the torque control lever to achieve the desired torque control.

Where still further reductions of engine noise are desired regional continuously variable stratification can be created by connecting the vaporizer section outlet, 7, of FIG. 1 to the several separate air fuel mixture channels, 22, which connect to the stratifier valve, 23, whose outlet, 24, then connects to the engine intake air ports, as shown in FIG. 2. The several separate air fuel mixture channels, 22, can subdivide the outlet flow of the vaporizer section, 3, both radially, as shown in the cross-sectional view of FIG. 2, and angularly, as by the divider, 25. In each such separate air fuel mixture channel, the air fuel vapor mixture therein will not only have continuously variable stratification within itself but will also differ from the air fuel vapor mixtures in adjacent channels since complete continuously variable stratification also exists throughout the entire exit flow from the vaporizer section, 3.

The stratifier valve, 23, can function to pick up individual regions of air fuel mixture, which are not adjacent in the complete continuously variable stratified mixture at outlet of the vaporizer section, as for example at 26 and 27 in FIG. 2, and place these individual regions adjacent at the stratifier valve outlets, 24. A discontinuity of the delay gradient can thus be created between regions, not originally adjacent, but thus made adjacent by action of the stratifier valve. It is in this way that the stratifier valve and the several separate air fuel mixture channels act to create a regional continuously variable stratified air fuel mixture at the engine intake ports; they place adjacent to one another regions of air fuel mixture which were not adjacent at outlet of the vaporizer section.

Many different kinds of stratifier valves can be used, as described in U.S. Pat. No. 4,205,647, to create regional continuously variable stratification. Preferably, however, the stratifier valve, 23, and the several separate mixture channels, 22, are so arranged and connected together that the following conditions apply:

a. The ratios of the flow rates in the several separate channels do not vary appreciably, and hence, if mixture flow is continuous at vaporizer section outlet, it is also continuous in each of the separate mixture channels and also in the engine intake.

b. Each region within the regional continuously variable stratified mixture at stratifier valve outlet is adjacent to regions with which it was not adjacent at outlet of the vaporizer section.

With these arrangements, corresponding to best multiregionality in the referenced patent, minimum engine noise will usually result.

The several separate air-fuel mixture channels, 22, connect the vaporizer section, 3, to the fixed ports, 28, 29, 30, of the stratifier valve, 23. When a moving port, 32, indexes with a fixed port, 28, of the stratifier valve, 23, air-fuel mixture flows through that separate air-fuel mixture channel, 22, connected to that fixed port through the air-fuel mixture channel and fixed port and moving port and on into the engine intake manifold. Each separate air-fuel mixture channel connects to at least one fixed port of the stratifier valve and each such fixed port connects to but a single separate air-fuel mixture channel. The number of different kinds of air-fuel vapor mixture available at the fixed ports of the stratifier valve is equal to the number of separate air-fuel mixture channels, 22.

The stratifier valve, 23, contains the fixed ports, 28, 29, 30, connecting to the several separate air-fuel mixture channels as described above, and the moving element, 34, containing the moving ports, 31, 32, 33, each of which can index with some fixed ports at some portion of its motion. The outlet of the moving ports and hence of the stratifier valve connects to the engine intake manifold. A rotating moving element, 34, is shown in FIG. 2 but other motion patterns can also be used such as oscillating or vibrating as described in reference A. Any suitable drive means can be used to move the moving element of the stratifier valve such as an electric motor, 56 a belted or geared or chained drive from the engine crankshaft or camshaft, etc. For example the rotating moving element shown in FIG. 2 could be belt driven from the engine crankshaft via a pulley connecting to the moving element shaft at 35.

The full or partial alignment of one moving port with one fixed port is referred to as an indexing or connecting. When a moving port and a fixed port are thusly indexed or connected during the intake stroke of a cylinder of the engine, the engine intake process will draw a region of air-fuel vapor mixture from that fixed port, through that moving port and on into the engine intake pipe and then the engine cylinder.

When the moving element of the stratifier valve makes one or several connectings together at the same time these one or several connectings are herein and in the claims referred to as a group of connectings. A sequence of several such groups of connectings will take place in succession with each full rotation or cycle of oscillation of the moving element of the stratifier valve and this sequence will then be repeated upon the next cycle of rotation or oscillation of the moving element. The term sequence or full sequence of groups of connectings is used herein and in the claims to describe this cyclic process for each full cycle of the moving element of the stratifier valve. Two groups of connectings, one immediately after the other, in the sequence are herein referred to as successive groups of connectings. During the intake process for a single engine cycle of a particular cylinder of the engine the moving element of the stratifier valve will preferably rotate or oscillate through several cycles and hence several sequences of groups of connectings can be carried out during said engine cycle and that entire set of connectings is herein and in the claims referred to as the batch of connectings for a single engine cycle.

When a moving port or two different fixed ports connect to different air-fuel mixture channels, these connections are herein referred to as differing connectings since they connect into the vaporizer section at different positions.

Where the moving element of the stratifier valve contains more than one moving port, some or all of these moving ports could be adjacent to one another. Connectings made simultaneously by such adjacent ports and also connectings made immediately in succession by a single port or by adjacent ports are herein referred to as adjacent connectings. Hence the air-fuel mixture regions drawn through such adjacent connectings will be adjacent to each other within the regional continuously variable stratified air-fuel mixture created in the engine intake pipe. Connectings can be thusly adjacent within a single group of connectings or as between two successive groups of connectings.

Where moving ports are separated, by at least one full width of the opening of the port, when connectings are made these connectings, thusly separated, are herein referred to as non-adjacent connectings. The air-fuel mixture regions drawn through such non-adjacent connectings will not be adjacent to each other within the regional continuously variable stratified air-fuel mixture created in the engine intake pipe. Connectings can be thusly non-adjacent within a single group of connectings or as between two successive groups of connectings.

A particular moving port may make connectings in immediate succession into two successive groups of connectings and such connectings are herein referred to as successive connectings. The air-fuel mixture regions drawn through successive connectings will be adjacent regions within the regional continuously variable stratified air-fuel mixture created in the engine intake pipe.

Two groups of connectings are said to be differing groups when at least one, and preferably all, of the moving ports of the stratifier valve changes from one air fuel mixture channel to another different channel, as between the two groups.

The several separate air-fuel mixture channels, 22, taken together with the fixed ports, 28, 29, 30, and the moving ports, 31, 32, 33, and the stratifier valve and drive means therefore constitute a means for making a batch of separate connectings of the intake pipe of the engine into the vaporizer section wherein separate connectings can differ as to the position in the vaporizer section outlet connected into and hence can differ as to the kinds of regions drawn into the engine intake manifold. It is the function of this means for making a batch of separate connectings to create the desired regional continuously variable stratified air-fuel mixture at engine intake by drawing several air fuel vapor mixture regions during each engine cycle from several such different positions in the vaporizer section outlet.

The preferred continuous flow of air-fuel mixture through each air-fuel mixture channel can be obtained by requiring that all air-fuel mixture channels are used in all groups of connectings in a full sequence of groups. This requirement also assures that a flow passage always exists, not only between the vaporizer section and the engine intake manifold, but also between the engine intake manifold and each air-fuel mixture channel. The preferred adjacency requirement for regions within the regional continuously variable stratified mixture at stratifier valve outlet can be secured by applying the following requirements together:

a. All air-fuel mixture channels are used in all groups of connectings in a full sequence of groups. This requires a number of moving ports at least equal to the number of mixture channels.

b. Each mixture channel makes non-adjacent connectings as between all pairs of successive groups of connectings in a full sequence of groups.

c. Each mixture channel makes non-adjacent connectings within each group of connectings in a full sequence of groups.

From the outlet of the stratifier valve, 23, the regional continuously variable stratified air-fuel mixture created thereby passes directly into the engine intake manifold and from thence passes on into each engine cylinder via the engine intake valves or ports during each intake process of the engine.

The essential features of some of the preferred forms of this invention have been described hereinabove. In some engine applications additional elements may be used and modified elements may be used. Several of these added elements and of these modified elements are now described hereinafter.

In almost all engine applications we prefer that all the atomized liquid fuel be fully evaporated into the intake air mass when the engine is running normally and fully warmed up. We also usually prefer that none of the air-fuel vapor mixtures within the continuously variable stratified air-fuel vapor mixture at engine intake be very much, if any, richer than about the chemically correct air-fuel ratio so that fuel combustion can be complete and efficient. Additionally, we prefer that all of the air-fuel mixtures within the continuously variable stratified air-fuel vapor mixture at engine intake be either spark ignitable or compression ignitable reasonably early in the engine expansion stroke so that combustion will be complete and efficient. The full evaporation object can be achieved by using adequately high air inlet temperatures into the vaporizer, particularly of air channels admitting air into the last part of the droplet trajectory, and also by selection of the kinds and sizes of fuel molecules put into the liquid fuel originally in the tank. Over richness can be avoided by adapting the air inflow distribution pattern and the air temperature pattern along the length of the droplet trajectory to the flow rate and vaporization pattern of the liquid fuel being used. The ignitability object can be achieved by avoiding overleanness anywhere in the continuously variable stratified air-fuel vapor mixture created at vaporizer section outlet, 7. Overleanness can be avoided by arranging to always direct some quantity of liquid fuel toward all portions of the vaporizer section through which air is flowing and by adjusting the extent to which air flows along and against the direction of the liquid droplet trajectories.

For highly turbocharged and otherwise highly supercharged engines, the air temperature increase consequent upon such high compression may be adequate to assure full evaporation of all the liquid fuel supplied to the vaporizer section, 3, and an additional intake air heater device is unnecessary for such engines. For these engines the air flows directly from the compressor outlet, or intercooler outlet if an intercooler is used, into the several separate air channels, 8, 9, 10, as shown in FIG. 1. The supercharger compressor itself becomes the intake air heater device as well as the intake air compressor.

Where higher air temperatures are needed, or where a supercharger is not used, an intake air heater can be placed upstream of the vaporizer section. For example, engine exhaust gas can be used to heat up all of the intake air to a single temperature or to heat up different portions of the intake air to different temperatures, these different portions then flowing into the several separate air channels. Such an exhaust gas fired intake air heater, 57, is shown in FIG. 1, with engine exhaust gas entering via the pipe, 58, and leaving via the pipe, 59. Commonly the hottest intake air will be distributed into that separate air channel, 8, which directs air to the outer portions of the liquid fuel droplet trajectories.

Avoiding overrichness and overleanness can be accomplished for a particular fuel by adapting the air inflow, the fuel inflow and the mixture outflow of the vaporizer section to each other so that each liquid fuel droplet contacts sufficient air flow all along its trajectory to avoid overrichness and each air mass encounters sufficient fuel droplets to avoid overleanness. This process of adapting air, fuel and mixture flow to avoid overrichness and overleanness can be illustrated by the following example using the FIG. 1 form of the invention with a spinning disc atomizer. If all air flowed into the vaporizer section, 3, only at the outermost radius via separate air channel, 8, and the outlet, 7, of the vaporizer section were of a very small diameter, only slightly larger than the spinning disc, then the entire air mass would flow largely radially inward against the radial outward motion of the fuel droplet trajectories. Apart from angular variations, the air-fuel vapor mixtures at vaporizer outlet, 7, will be very nearly uniform radially since each air mass will have contacted essentially the same number of fuel droplets. As we now increase the diameter of the vaporizer outlet, 7, a radial air-fuel vapor ratio gradient will be created. Note that those air masses leaving the vaporizer section at the outer radius of the outlet, 7, will have encountered a smaller number of fuel droplets than those air masses leaving the vaporizer section near the center of the vaporizer outlet. Hence the radial air-fuel vapor ratio gradient will become fuel leaner with increasing radius at the vaporizer section outlet. The overall difference of air-fuel vapor ratio across the vaporizer outlet becomes larger the more we increase the diameter of the outlet, 7, up to the vaporizer section diameter. In this way overleanness can be avoided by keeping the diameter of the vaporizer outlet, 7, somewhat smaller than that diameter at which overleanness occurs as shown, for example, by excess unburned fuel in the engine exhaust. As the air-fuel vapor ratio becomes leaner at the outer radius of the outlet, the air-fuel vapor ratio necessarily becomes fuel richer at the inner radius of the outlet, 7. If air-fuel vapor ratios at the innermost radius are somewhere fuel richer than the chemically correct ratio, some heated air may be admitted to the vaporizer section at radii shorter than the outermost via the separate air distributor channels, 9, and, 10, and this air, being initially free of fuel vapor at these shorter radii, will make fuel leaner the air-fuel mixtures created at these radii. In this way the air-fuel vapor ratio at the innermost radius may be adjusted to being little or no richer in fuel than the chemically correct ratio and overrichness can thus be avoided. The relative flow of air as between the several separate air distributor channels 8, 9, 10, into the vaporizer section, 3, can be adjusted as described above by adjustment of the flow restricting dampers, 14, 15, 16. Where a particular fuel is used in a particular application of a preferred turbocharged engine, the flow restricting dampers, 14, 15, 16, and the vaporizer outlet diameter can be once preset to achieve the desired air-fuel vapor ratio variation and with neither overrichness nor overleanness and with full evaporation of all liquid fuel, without further need of adjustment.

Engine applications where a wide variety of fuels are to be used, varying appreciably in vapor pressure distributions, may need an adjustable diameter for the vaporizer outlet, 7. The vaporizer outlet diameter could be made thusly adjustable in various ways as, for example, by use of flexible wall materials with a constrictor band, or by use of a multi-segment aperture as used on cameras. Preferably, however, a fixed diameter of vaporizer outlet, 7, is used and compensation for fuel variations is accomplished via adjustment of the air inflow distribution via the flow restricting dampers, 14, 15, 16, as this is mechanically simpler.

The liquid fuel flow into the vaporizer section, 3, is angularly nonuniform in order to create air-fuel vapor ratio gradients angularly across the liquid droplet motion paths. To avoid overleanness, at least some liquid fuel must necessarily be directed by the spinning disc, 20, into all angular segments about the disc spin axis whenever air is flowing through the vaporizer section. Where the offset of the fuel supply pipe, 19, from the spin axis of the spinning disc is only a moderate proportion of the disc outer radius, some liquid will be spun off the disc into all angular segments and the above requirement can thusly be met. Where a large offset of the supply pipe, 19, is used, an additional fuel supply pipe, 19, can be used to supply some liquid fuel to the center of the spinning disc, as shown in FIG. 3 for example, and in this way a supply of some liquid fuel into all angular segments can be assured.

The liquid fuel flow into the vaporizer section, 3, varies with time in order to create an air-fuel vapor ratio gradient across the liquid droplet motion paths in the direction of mixture outlet flow. To avoid overleanness at least some liquid fuel must necessarily flow into the vaporizer section at all times when air is flowing. Hence the fuel flow rate is not to decrease to zero during the fuel flow pulses, except when and if air flow stops. The possibility of overrichness can be decreased by decreasing the amplitude of the separate fuel flow pulses. These requirements can be met in various ways by suitable design of the fuel flow controller, 5, as explained hereinafter.

We thus have at hand several ways to accommodate engines and fuels to one another. For a particular fuel composition we can adjust the air heaters, and hence the inlet air temperatures, as well as the radial distribution of air inflow and mixture outflow of the vaporizer so that all the fuel will be evaporated and overrichness and overleanness will be avoided. Also, for a particular arrangement of the air heaters and the air inflow and mixture outflow distributions we can adjust the molecular composition of the fuel so that all the fuel will be evaporated and overrichness and overleanness will be avoided. It can be in this way that engines and fuels are accommodated to each other for efficient operation of the system.

The vaporizer section, 3, is shaped to enclose the spray of liquid droplets coming from the atomizer, 4, and thus for the spinning disc atomizer a round vaporizer section cavity is used as shown in FIG. 1. The depth of the vaporizer section cavity along the direction of the axis of spin of the spinning disc, 20, is made large enough so that droplets cannot impinge upon the interior surfaces of the vaporizer section except at the outermost radius where the droplet catcher, 6, is located. The individual liquid droplets leaving the atomizer must spend enough time within the vaporizer section, 3, to become fully evaporated before reaching the last droplet catcher. As the speed of the outer edge of the spinning disc, 20, increases the time available for evaporation within a particular outer radius of the vaporizer decreases, since the average speed of the droplets increases, but the rate of heat transfer to the droplet also increases since smaller droplets are produced. An approximate analysis of these effects indicates that the outer radius of the vaporizer should be increased in proportion to the square root of the outer radius of the spinning disc, 20. Heat transfer to the droplets is also increased by higher air temperatures and by the higher air flow speeds of higher engine RPM. Very approximately the outer radius of the vaporizer section should be increased in proportion to the reciprocal of the product of engine RPM and the difference between air temperature and liquid droplet temperature.

A liquid fuel droplet which fails to evaporate completely before reaching the outer radius of the vaporizer section, 3, will impinge upon the outer surface thereof and run down into the droplet catcher, 6. Such unevaporated liquid portions can then be returned to the fuel tank via the retank pipe, 39, and the retank regulator, 40. For the preferred turbocharged engine case the supercharge pressure will usually be adequate to force such unevaporated liquid portions back to the fuel tank and a simple float operated liquid trap can be used for the retank regulator, 40, passing only liquid when present and closing to prevent escape of supercharged air-fuel mixture. Any of the other well known types of liquid traps can alternatively be used for the retank regulator, 40. For atmospherically aspirated engines, where no pressure of supercharge will be available to force liquid fuel back to the tank, the retank regulator, 40, can act to turn on a retank pump if needed whenever liquid fuel is present in the droplet catcher, by means already well known in the art.

When an engine is running normally and fully warmed up, the droplet catcher, 6, and retank system are inoperative since the air heater system, the vaporizer section and the liquid fuel atomizer are designed and adjusted so that all liquid droplets are fully evaporated before reaching the droplet catcher, 6, as described above. It is during the cold starting and subsequent warmup of an engine that the droplet catcher, 6, and retank system operate for it is then necessary to supply a great excess of liquid fuel via the fuel flow controller, 5, to the liquid atomizer, 4, since only a small portion of this liquid fuel can evaporate at the cold air temperatures of starting and warmup, as is well known in the art. In a conventional gasoline engine, using a carburetor to create the intake air fuel mixture, this excess liquid fuel for cold starting and warmup is unavoidably swept on into the engine cylinder and must subsequently be emitted via the exhaust or the crankcase vent into the atmosphere as unburned hydrocarbon pollutants since no excess air is available to burn it.

In an atmospherically aspirated engine, overall air-fuel ratio necessarily increases as fuel flow rate per engine revolution is increased, in order to increase engine torque, since air flow per engine revolution remains essentially constant. To avoid overrichness at the early parts of the droplet trajectory in the vaporizer section, we want to increase air flow into these early parts of the droplet trajectory and correspondingly decrease air flow into the outermost radius of the vaporizer as torque increases. The net effect of this air flow redistribution is to be that the air-fuel vapor ratio becomes gradually more nearly uniform and approaches toward chemically correct along the full length of the droplet trajectory as engine torque is increased by increase of fuel flow rate per engine revolution. This desired redistribution of air flow, via the several separate distributor channels, 8, 9, 10, into the vaporizer section, 3, can be accomplished with an air-fuel proportioner linkage connecting the torque control lever, 18, to the adjustment levers of the flow restricting dampers, 14, 15, 16, within the several separate air channels, 8, 9, 10, said air-fuel proportioner linkage being designed and adjuted to increase the flow of air through distributor channel 10 and perhaps channel 9 also and correspondingly to decrease the flow of air through distributor channel 8 as fuel flow rate per engine revolution is increased via adjustment of torque control lever. 18.

In an atmospherically aspirated engine overrichness due to the angular non-uniformity of fuel flow rate about the spinning disc, 20, can be avoided in various ways. For example, the offset at which fuel is supplied by the supply pipe, 19, to the spinning disc, 20, can be reduced as engine torque is increased. The air-fuel prportioner linkage from the torque control lever, 18, can also accomplish this adjustment of offset.

The vapor fractionator device described herein is particularly well adapted for use with supercharged engines especially of the turbosupercharger type. The compressor of the supercharger is preferably located upstream of the air heater, if used, so the entire vaporizer section operates at about supercharger air pressure. For a turbocharged engine it may only be necessary to increase total air flow to the engine as fuel flow increases to avoid overrichness in all regions and this can be accomplished by speeding up the exhaust gas driven turbine and hence also the air compressor, thus increasing the inlet air pressure to the engine. The speed of the exhaust gas driven turbine can be controlled by control of turbine nozzle area or by control of an exhaust gas dump valve bypassing the turbine with means already well known in the art of turbosuperchargers. Hence the air-fuel proportioner can act to sense fuel flow rate per engine revolution and respond by increasing the turbocharger speed as fuel flow rate increases and means for such sensing and responding are already well known in the art.

When fuel flow per engine cycle is increased on a turbocharged engine, more power is inevitably developed by the exhaust gas driven turbine even without controls and thus the turbine and supercharge compressor will speed up and supply more air to the engine without use of any air-fuel proportioner or other control. The exhaust turbine and air compressor are in effect "free-wheeling" on the attached engine. Hence we can design an engine-turbocharger-stratifier system which self regulates air flow in proper portion to fuel flow without the need of an air-fuel proportioner control. Such an engine system would have improved mechanical simplicity.

One example of the use of a device of this invention with a supercharger is shown diagrammatically in FIG. 7 and comprises a supercharge compressor, 60, driven by an exhaust gas turbine, 61, with the compressed air from the supercharger, 60, passing into the vaporizer section, 3, via the pipe, 1. Continuously variable stratified air fuel vapor mixture leaves the vaporizer section, 3, via the pipe, 7, and enters the engine cylinder, 62, via the intake valve, 63. The burned gases leave the engine cylinder, 62, via the exhaust valve, 64, and exhaust pipe, 65, from whence exhaust gas flows in whole or part through the exhaust gas turbine, 61, which drives the supercharger, 60. Fuel flows via the pipe, 17, the fuel flow controller, 5, and the pipe, 19, into the vaporizer section, 3. The fuel flow quantity is controlled by the torque control lever, 18, which may also be linked, as shown in FIG. 7, via a linkage, 66, to the exhaust gas dump valve, 67, so that the exhaust gas flow to the exhaust turbine, 61, is increased as fuel flow rate is increased. Only a portion of the internal combustion engine mechanism is shown in FIG. 7, and that for only one of the cylinders, such as the valves, 63, 64, cylinders, 62, pistons, 68, but the features of an internal combustion engine mechanism are already well known in the art.

Other schemes for securing the desired full evaporation of the liquid fuel and absence of overrichness and overleanness can also be used, as are described in U.S. Pat. No. 4,205,647, such as the use of air-fuel vapor ratio sensors and controls and droplet sensors and controls.

Instead of varying the angular distribution of fuel flow in the vaporizer section, 3, an angular variation of air flow can be used for creation of the desired angular air-fuel vapor ratio gradient. For example, many turbocharger compressors use vaned diffusers at exit producing an angular variation of air flow rate about the compressor shaft centerline due to the flow retarding effect of the diffuser vanes. This angular variation can be retained and carried into the vaporizer section, as by extending the diffuser vane surfaces, so that this angular air flow variation is also about the spinning disc spin axis. In this case a plain spinning disc, 20, can be used with zero offset of the feed pipe, 19, and the angular variation of air-fuel vapor ratio about the spin axis results from the angular variation of air flow rate. The angular air-fuel vapor ratio gradient can be additionally varied by combining such angular variations of air-flow rate with angular variations of fuel flow as described earlier. Where both fuel flow and air flow are thus varied angularly, it may be desireable, in some applications, to provide means for adjusting the angular fuel distribution pattern relative to the angular air distribution pattern. For example, where an offset feed pipe, 19, is used to create the angular fuel flow variation, the angular position of the fuel feed pipe, 19, can be adjusted relative to the air inlet guide vanes in order to secure the desired angular variations of air-fuel vapor ratio.

The fuel flow controller, 5, is a means for supplying liquid fuel to the spinning disc atomizer and for controlling the amount of fuel supplied in order to control engine torque. Preferably the fuel is supplied to the spinning disc in a series of two or more pulses during each engine intake process with the pulse pattern being the same for all engine intake processes. Also preferably the fuel flow pulse pattern is adapted to the air flow pulse pattern so that both overrichness and overleanness are avoided. the following example for a four cylinder, four stroke cycle engine will illustrate how these preferred fuel flow pulse pattern requirements can be met.

Air flow rate, AR, during an engine intake process varies approximately sinusoidally with engine crank angle, CA, for a four stroke cycle engine of four cylinders ask follows:

$$AR = am \text{ Sine } CA$$

wherein am is the maximum air flow rate experienced during an intake process.

The above preferred fuel flow pulse patterns can be obtained in various ways. For example, fuel flow rate, FRV, can vary during an engine intake stroke with an even integral multiple, n, of the engine crank angle as follows for a four stroke cycle four cylinder engine:

$$FRV = (fm/2) [\text{Sine } CA][1 + \text{Cos } nCA]$$

wherein fm is the maximum multipulse fuel flow rate experienced during an intake process. The number of fuel flow pulses per engine intake stroke is one greater than half the value of n. A small fuel flow lead angle may also be introduced to allow time for the fuel to get on the spinning disc and to be spun off the disc edge. Engine torque control can be then obtained by arranging the torque control lever, 18, to control the size of fm. But this fuel flow pulse pattern invites creation of overleanness since fuel flow stops at times even though air flow continues. This shortcoming can be corrected by adding to the above multipulse fuel flow, FRV, a base fuel flow component, FRO, whose rate is proportional to air flow, AR, as follows:

FRO = fo[Sine CA]

The total fuel flow rate, FR, is then the sum of the multipulse fuel flow, FRV, and the base fuel flow, FRO, and the maximum overall air-fuel ratio, MAXA/F, and the minimum overall air-fuel ratio, MINA/F, become:

MINA/F = am/fm + fo)

MAXA/F = (am/fo)

The fuel flow controller, 5, is then designed with that value of fo which produces a value of MAXA/F which is at least compression ignitable within the early part of the expansion stroke or preferably earlier. The fuel flow controller, 5, is further designed so that the largest possible value of the adjustable fm yields a MINA/F at most equal to or only slightly richer than chemically correct. This particular example fuel flow pulse pattern, as well as various other fuel flow pulse patterns, could be readily generated by two or more piezoelectric fuel pumps driven by a control circuit whose control inputs were engine crank angle, engine crank speed, and torque control setting, by methods already known in the art of piezoelectric fuel pumps and electronic control circuits.

Overleanness may yet occur when the above example fuel flow pulse pattern is used due to the angular variation of fuel flow rate about the spinning disc. The possibility of such angular overleanness can be reduced by delivering the base fuel flow component, FRO, to the center of the spinning disc, 20, with zero offset so that this base fuel component is distributed angularly uniformly. Any remaining overleanness can then always be eliminated by increasing the value of fo.

Overrichness may also occur when the above example fuel flow pulse pattern is used due to the angular variation of fuel flow rate about the spinning disc. The possibility of such angular overrichness can be reduced by reducing the offset at which the multipulse fuel flow component, FRV, is delivered to the spinning disc, 20, and also by reducing the value of fm.

Similar fuel flow pulse patterns could alternatively be generated by positive displacement mechanical plunger pumps of the swashplate type. Several plungers of differing diameters would yield the desired differing fuel flow pulse quantities, the torque control lever, 18, would adjust swashplate angle and hence stroke of those plungers providing the multipulse fuel flow component, FRV, and the swashplate would be timed properly to the engine cranks.

The foregoing is an illustrative example, and for engines of two stroke cycle as well as for engines of other than four cylinders the air flow pulse pattern may differ from the above and consequently a different fuel flow pulse pattern may be preferred.

Other fuel flow pulse patterns can also be used and also other torque control methods. For example, where all fuel flow pulses deliver equal quantities, a fixed displacement mechanical pump could be used and the number of such pulses per intake stroke could be varied to control torque as by changing the speed ratio between the pump drive shaft and the engine crankshaft.

Although a fuel flow controller, 5, which created a steady, non-pulsing, flow of liquid fuel onto the spinning disc, 20, can be used, the angular air-fuel ratio gradients and hence delay gradients will be reduced. Nevertheless, this arrangement may be suitable in some engine applications as, for example, where an engine of six or more cylinders is served by a single vaporizer section, 3, in order to reduce engine cost.

The foregoing descriptions of various types of fuel flow controller are intended as illustrative examples and it is not intended to limit this invention to these examples only.

One form of spinning disc atomizer, 4, is shown in FIG. 3, with the spinning disc, 20, driven at high speed via the drive shaft, 21. Liquid fuel is supplied to the spinning disc from the fuel flow controller via one or more fuel inlet pipes, 19, whose discharge point is offset for some by the distance, 36, from the disc spin axis, 37. The offset distance, 36, may be set anywhere from zero up to the outer radius of the spinning disc, 20, and in some engine application may be made adjustable over this range. The angular position of the offset, 36, may also be adjusted to fit the angular fuel flow variation pattern to any angular air flow variation pattern as described hereinabove.

An alternative form of spinning disc atomizer, 4, is shown in FIG. 4, with the spinning disc, 20, being a masked spinning disc having a mask, 38. The mask, 38, restricts liquid flow in some areas, 41, more than in other areas, 42, and in this way an angular fuel flow variation is created. Liquid fuel may be supplied to this masked spinning disc via one or more fuel inlet pipes, 19, and either with zero offset, as shown in FIG. 4, or with an offset as described earlier. Various types of mask and flow passages may be used to achieve different patterns of angular fuel flow variation.

Other forms of spinning disc atomizer may also be used. For example a fluted spinning disc or disc with variations in the outer radius would create angular fuel flow variations. Combinations of flutes and masks could also be used on the spinning disc.

Although the spinning disc, 20, can be driven via its drive shaft, 21, from the engine crankshaft via gears or belts or from the turbocharger shaft, these direct engine drive means suffer from inadequate disc spin speed during engine cold starting. If a single drive means is to be used, an electric motor drive of the spinning disc is preferred as providing high disc speeds and consequently good liquid fuel atomization, not only during normal engine running but also during engine cold starting. A dual drive means can also be used wherein an electric motor, or a compressed air motor, drives the spinning disc during cold starting and then, once the engine is running, a direct engine drive means, as from the turbocharger shaft, takes over and the electric motor is turned off. Such a dual drive means reduces greatly the electric power needs but is mechanically complex and more costly than a single drive means.

Other types of liquid fuel atomizers can also be used as, for example, pulsed pressure atomizing nozzles or vibratory atomizers or compressed air atomizers. In order to obtain continuously variable stratified air-fuel mixtures when using a single atomizer, the exit spray may be moved transversely relative to the air inflow, as by rotating a nozzle or by rocking a nozzle back and forth. Alternatively the nozzle can be stationary and the exit spray moved back and forth by action of a suitably designed nozzle exit valve. With pulsed flow from a nozzle or vibratory atomizer or air atomizer additional air-fuel ratio gradients can be created along the liquid fuel motion paths.

These spinning disc and droplet catcher schemes, as shown for example in FIG. 1, can be further extended to use a cascade of several spinning discs and droplet catchers wherein the unevaporated liquid from a first spinning disc atomizer is caught in a first droplet catcher and this liquid is then fed on to a second spinning disc atomizer which has also its own separate second droplet catcher. This process of returning unevaporated liquid back from a droplet catcher to a further spinning disc atomizer can be continued through several such disc and catcher units in the cascade. Liquid fuel can then be retanked from the last droplet catcher in the cascade. An example of such spinning disc and droplet catcher cascade is shown in FIG. 5 wherein only the spinning discs, droplet catchers, and fuel distribution means are shown. Liquid fuel from the liquid fuel flow controller, 5, is supplied via the fuel feed pipe, 19, to a first spinning disc atomizer, 43, which is spun by the first disc drive shaft, 44. Unevaporated liquid fuel from this first spinning disc atomizer is caught in the first droplet catcher, 45, and is transferred by the liquid transfer means, 48, via a second fuel feed pipe, 50, from the first droplet catcher, 45, on to a second spinning disc atomizer, 46, which is spun by the second disc drive shaft, 47. The spinning disc drive shafts, 44 and 47, can be separate as shown in FIG. 5 or can be common if both discs are to be spun at the same angular velocity. Where only two discs are used in the cascade of discs and catchers, the second droplet catcher, 49, can then be connected via the retank pipe, 39, and the retank regulator, 40, to the liquid fuel tank. The cascade shown in FIG. 5 has only two spinning disc atomizers and droplet catchers but any number of these can be used. The several separate spinning disc atomizers in the cascade can be of the same or different outside diameter and geometric shape, can be rotated in the same or preferably successively opposite directions, and can be rotated at the same or different angular speeds. The several separate liquid fuel transfer means, 48, can be any of several different kinds of transfer pumps capable of transferring all liquid fuel caught in the connected droplet catcher. Preferably, the liquid fuel transfer means, 48, transfers liquid fuel in a series of pulses, there being preferably at least two or more such pulses for each engine air intake process. Preferably the several separate fuel feed pipes, 50, direct the transferred liquid fuel on to the spinning discs, 46, offset from the center of rotation of the disc, as is shown in FIG. 5.

Within such a cascade of discs and catchers different spinning discs will be atomizing liquid fuels whose molecular compositions will be different since the fuel caught in a droplet catcher differs from that fed to the spinning disc feeding into that droplet catcher because some of the more volatile molecules have been lost in transit from the spinning disc to the droplet catcher. Hence each spinning disc in the series of discs within a cascade is atomizing a molecularly different fuel. Additionally, if two different tank fuels are available, such as gasoline in one tank and alcohol in another tank, these differing fuels can be first fed on to different spinning discs in the cascade either alone or in combination with unevaporated liquid transferred from a preceding droplet catcher to increase further the molecular difference between discs.

By feeding the liquid fuel on to the spinning disc at an offset from the disc spin center, as is shown in FIG. 5, a cascade of several discs and catchers, makes possible the creation of angular gradients of types of molecules present within the continuously variable stratified air fuel vapor mixture created at outlet, 7, from the vaporizer section, 3. This angular molecule type gradient results from the fact that angularly adjacent air masses can pass through, and hence receive fuel vapor from, different relative proportions of the several molecularly different liquids being atomized in the cascade in an angularly unsymmetrical way.

With pulsed flow of liquid on to the spinning discs in a cascade of several discs and catchers, a gradient of types of molecules present may also be created along the direction of air flow within the continuously variable stratified air fuel vapor mixture created at outlet, 7, from the vaporizer section, 3. This molecule type gradient in the direction of air flow results from the fact that air masses passing through the cascade at different times can pass through, and hence receive fuel vapor from, different relative proportions of the several molecularly different liquids being atomized in timed pulses in the cascade.

In these ways the use of a cascade of several discs and catchers makes possible the creation of larger delay gradients, in both the angular and air flow directions within the continuously variable stratified air fuel mixture passing into the engine, than can be created by a single spinning disc atomizer alone. To the gradients of air fuel vapor ratio available from a single spinning disc can now be added the gradients of types of molecules present available from a cascade of several spinning discs and droplet catchers.

The size of the vaporizer section enclosing the several spinning discs and droplet catchers can be reduced in the droplet trajectories direction when a cascade of several discs and catchers is used instead of a single spinning disc, since full evaporation of the liquid can now take place in several atomized sprays instead of just one.

Preferably a cascade of several discs and catchers is arranged so that those low vapor pressure liquid portions which are last to evaporate first meet the fresh incoming air since full evaporation of these portions is more readily accomplished by these hotter air masses.

Similar cascades of atomizers and droplet catchers can also be used wherein the atomizer is a pressure atomizer or vibratory atomizer or air atomizer or other type of liquid atomizer. By using a cascade of pulsed flow pressure atomizing nozzles and droplet catchers, with each successive pressure atomizer placed so that its liquid fuel motion paths make an angle to those of the preceding pressure atomizer, it is no longer necessary to move a nozzle exit spray back and forth as for a single spray nozzle in order to achieve continuously variable stratification. An example of such a cascade of pressure atomizer nozzles and droplet catchers is shown in FIG. 6 wherein only the pressure atomizers, 51, 52, droplet catcher, 45, liquid transfer means, 48, and liquid fuel flow controller, 5, are shown installed in a vaporizer section, 3, from which the continuously variable stratified air fuel mixture created therein leaves via the exit, 7, to the engine intake. Unevaporated liquid from the first pressure atomizer, 51, in the cascade is caught in the droplet catcher, 45, and then fed therefrom in pulses by the liquid transfer means, 48, to the succeeding second pressure atomizer, 52. Where only two pressure atomizers are used in the cascade, as shown in FIG. 6, the angle between the liquid fuel motion paths of these two atomizers is preferably about 90 degrees as shown.

Additional delay gradient components due to gradients of the kinds of molecules present can be created transversely to the liquid fuel motion paths by using two or more separate and different fuels and fuel tanks together with separate feed pipes to the spinning disc atomizer, or separate spray nozzles. For example, four feed pipes, 19, offset in pairs, diametrically opposite, could be used with two different fuels which are pulsed alternately to opposite sides of the spinning disc, 20. This particular arrangement would produce gradients of kinds of molecules present not only in an angular direction but also in the direction of flow of the air-fuel mixture and hence in both directions transverse to the liquid fuel motion paths in the vaporizer section, 3. Although two separate fuel systems and tanks is a costly and inconvenient scheme, it does offer a means to utilize two different fuels, such as gasoline and methanol, which are immiscible or difficulty miscible.

Having thus described my invention, what I claim is:

1. An internal combustion engine, utilizing continuously variable stratified air fuel vapor mixtures at intake, comprising:

an internal combustion engine mechanism comprising;

at least one engine cylinder with at least one piston operative within each of said cylinders;

each of said engine cylinders comprising an intake pipe;

means for timing the separate cycles of said engine cylinders relative to each other;

at least one fuel tank;

at least one enclosed vaporizer section comprising;

an air inlet;

at least one liquid fuel inlet;

an air fuel vapor mixture outlet;

means for connecting said air fuel mixture outlet of each of said vaporizer sections to the intake pipes of a group of engine cylinders so that, said group of engine cylinders comprises at least one of said engine cylinders, each of said intake pipes of said engine cylinders is connected to said air fuel mixture outlet of at least one vaporizer section;

means for delivering liquid fuel into each of said vaporizer sections, via said liquid fuel inlets, so that; at least one kind of fuel is delivered; the instantaneous liquid fuel flow rate of at least one kind of fuel increases and decreases in pulses, with the number of said pulses occurring during each intake process of the connected group of engine cylinders being at least two, said pulses occurring equally during each intake process of the connected group of engine cylinders; fuel flow rate is zero only when no intake process is occurring;

means for controlling the total flow of liquid fuel delivered into each of said vaporizer sections;

at least one means for accelerating, directing, and proportioning said delivered liquid fuels within each of said vaporizer sections so that, said liquid fuels are accelerated to a high velocity of motion along several motion paths, different liquid fuel portions flowing concurrently are directed into different liquid fuel motion paths, said different liquid fuel motion paths differing by being at least both non-coincident and non-intersecting, the said different liquid fuel portions flowing concurrently are proportioned to differ in quantity as well as motion path direction;

means for directing and distributing the air flowing into each said vaporizer section via said air inlet so that, said air flows across the high velocity motion paths of the liquid fuel, and so that each air portion flows closely adjacent at least one fuel portion and each fuel portion flows closely adjacent at least one air portion within said vaporizer section.

2. An internal combustion engine, utilizing continuously variable stratified air fuel vapor mixtures at intake, comprising:

an internal combustion engine mechanism comprising;

a number of engine cylinders, with at least one piston operative within each of said cylinders, at least equal to the integral number of piston strokes required by one engine cylinder and piston to complete one full engine cycle;

each of said engine cylinders comprising an intake pipe;

means for timing the separate cycles of said engine cylinders relative to each other;

at least one fuel tank;

at least one enclosed vaporizer section comprising;

an air inlet;

at least one liquid fuel inlet;

an air fuel vapor mixture outlet;

means for connecting said air fuel mixture outlet of each of said vaporizer sections to the intake pipes of a group of engine cylinders so that, said group of engine cylinders comprises a plurality of said engine cylinders with the number of cylinders in said group at least equalling the integral number of piston strokes required by one engine cylinder and piston to complete one full engine cycle, each of said intake pipes of said engine cylinders is connected to said air fuel mixture outlet of but one vaporizer section;

said means for timing the separate cycles of said engine cylinders timing said cylinders of said group so that at least one engine intake process is occurring at essentially all times when said engine is running;

means for delivering liquid fuel into each of said vaporizer sections, via said liquid fuel inlets, so that; at least one kind of fuel is delivered; the instantaneous liquid fuel flow rate of at least one kind of fuel increases and decreases in pulses, with the number of said pulses occurring during each intake process of the connected group of engine cylinders being at least two, said pulses occurring equally during each intake process of the connected group of engine cylinders; fuel flow rate is zero only when no intake process is occurring;

means for controlling the total flow of liquid fuel delivered into each of said vaporizer sections;

at least one means for accelerating, directing, and proportioning said delivered liquid fuels within each of said vaporizer sections so that, said liquid fuels are accelerated to a high velocity of motion along several motion paths, different liquid fuel portions flowing concurrently are directed into different liquid fuel motion paths, said different liquid fuel motion paths differing by being at least both non-coincident and non-intersecting, the said different liquid fuel portions flowing concurrently are proportioned to differ in quantity as well as motion path direction;

means for directing and distributing the air flowing into each said vaporizer section via said air inlet so that, said air flows across the high velocity motion paths of the liquid fuel, and so that each air portion flows closely adjacent at least one fuel portion and each fuel portion flows closely adjacent at least one air portion within said vaporizer section.

3. An internal combustion engine, utilizing continuously variable stratified air fuel vapor mixtures at intake, as described in claim 2;

wherein said means for accelerating, directing and proportioning said delivered liquid fuels comprises; a spinning disc atomizer comprising at least one spinning disc and means for driving said spinning discs;

and further comprising means for directing the liquid fuel flow, delivered by said means for delivering liquid fuel, onto a surface of at least one of said spinning discs, said surface being essentially normal to the spin axis of said spinning disc.

4. An internal combustion engine, utilizing continuously variable stratified air fuel vapor mixtures at intake, as described in claim 2;

wherein said means for accelerating, directing and proportioning said delivered liquid fuels comprises; a spinning disc atomizer comprising at least one spinning disc and means for driving said spinning discs;

and further comprising means for directing the liquid fuel flow, delivered by said means for delivering liquid fuel, onto a surface of at least one of said spinning discs, said surface being essentially normal to the spin axis of said spinning disc so that, at least some portions of said liquid fuel are placed upon said spinning disc at an offset from the spin axis of said spinning disc, and so that said offset exceeds zero but does not exceed the outer radius of said spinning disc;

wherein said means for directing and distributing the air into said vaporizer section directs said air so that the air flow quantities crossing each liquid fuel motion path are essentially the same.

5. An internal combustion engine, utilizing continuously variable stratified air fuel vapor mixtures at intake, as described in claim 4;

and further comprising means for adjusting said offset in proportion to total liquid fuel flow rate so that said offset increases as liquid fuel flow rate increases and so that said offset decreases as liquid fuel flow rate decreases.

6. An internal combustion engine, utilizing continuously variable stratified air fuel vapor mixtures at intake, as described in claim 2;

wherein said means for accelerating, directing and proportioning said delivered liquid fuels comprises; a masked spinning disc atomizer comprising at least one masked spinning disc and means for driving said spinning discs, said masked spinning disc comprising means for proportioning said liquid fuel portions so that the liquid fuel flow rate per unit of angle about the disc spin axis varies as between adjacent separate liquid fuel portions flowing concurrently;

and further comprising means for directing the liquid fuel flow, delivered by said means for delivering liquid fuel, onto a surface of at least one of said masked spinning discs, said surface being essentially normal to the spin axis of said spinning disc;

and further wherein said means for directing and distributing the air into said vaporizer section directs said air so that the air flow quantities crossing each liquid fuel motion path are essentially the same.

7. An internal combustion engine, utilizing continuously variable stratified air fuel vapor mixtures at intake, as described in claim 2;

wherein said means for accelerating, directing and proportioning said delivered liquid fuels comprises; a spinning disc atomizer, comprising at least one spinning disc and means for driving said spinning discs, with the outer radius of said spinning disc varying angularly;

and further comprising means for directing the liquid fuel flow, delivered by said means for delivering liquid fuel, onto a surface of at least one of said spinning discs, said surface being essentially normal to the spin axis of said spinning disc;

and further wherein said means for directing and distributing the air into said vaporizer section directs said air so that the air flow quantities crossing each liquid fuel motion path are essentially the same.

8. An internal combustion engine, utilizing continuously variable stratified air fuel vapor mixtures at intake, as described in claim 2;

wherein said means for directing and distributing the air into said vaporizer section directs said air so that the air flow quantities crossing each liquid fuel motion path are different.

9. An internal combustion engine, utilizing continuously variable stratified air fuel vapor mixtures at intake, as described in claim 2;

wherein said means for accelerating, directing, and proportioning said delivered liquid fuels comprises; a pressure atomizer comprising at least one pressure atomizing nozzle, and a connection from the discharge of said means for delivering liquid fuel to at least one of said pressure atomizing nozzles;

and further wherein said means for delivering liquid fuel delivers said liquid fuel at a high pressure to said pressure atomizing nozzles.

10. An internal combustion engine, utilizing continuously variable stratified air fuel vapor mixtures at intake, as described in claim 2;

wherein said means for accelerating, directing and proportioning said delivered liquid fuels comprises a cascade of atomizers, droplet catchers, and liquid transfer means arranged in series, said cascade comprising;

at least two means for accelerating, directing and proportioning liquid fuels, each of said means for accelerating, directing and proportioning being an atomizer;

means for catching unevaporated liquid from each preceding atomizer of said series, each of said means for catching being a droplet catcher;

means for transferring said unevaporated liquid from each preceding droplet catcher into the next following atomizer in said series, each of said means for transferring being a liquid transfer means, each of said liquid transfer means transferring unevaporated liquid;

said series of said cascade comprising, a first atomizer which receives liquid fuel from said means for delivering liquid fuel into said vaporizer section, a first droplet catcher positioned to catch unevaporated liquid from said first atomizer, a second atomizer, a first liquid transfer means which transfers said unevaporated liquid from said first droplet catcher to said second atomizer, said series containing, at least two atomizers in said series arrangement, a number of droplet catchers at least equal to one less than the number of atomizers, a number of liquid transfer means equal to one less than the number of atomizers;

all of said atomizers of said cascade being means for accelerating, directing, and proportioning liquid fuels so that, said liquid fuels are accelerated to a high velocity of motion along several motion paths, different liquid fuel portions flowing concurrently are directed into different liquid fuel motion paths, said different liquid fuel motion paths differing by being at least both non-coincident and non-intersecting;

at least one of said atomizers of said cascade being means for accelerating, directing and proportioning liquid fuels so that different liquid fuel portions flowing concurrently through said at least one atomizer are proportioned to differ in quantity as well as motion path direction.

11. An internal combustion engine, utilizing continuously variable stratified air fuel vapor mixtures at intake, as described in claim 10;

wherein said atomizers within said cascade are spinning disc atomizers comprising:

spinning discs and means for driving each of said spinning discs;

means for directing the liquid fuel flow, delivered by said means for delivering liquid fuel, onto a surface of at least one and at least the first spinning disc in said series of said cascade, said surface being essentially normal to the spin axis of said spinning disc;

means for directing the liquid fuel flow, delivered by each of said liquid transfer means, onto a surface of the next following spinning disc in said series of said cascade, said surface being essentially normal to the spin axis of said spinning disc.

12. An internal combustion engine, utilizing continuously variable stratified air fuel vapor mixtures at intake, as described in claim 11;

wherein at least one of said means for directing liquid fuel flow onto a surface of a spinning disc directing said liquid flow so that, at least some portions of said liquid fuel are placed upon said disc at an offset from the spin axis of said spinning disc, and so that said offset exceeds zero but does not exceed the outer radius of said spinning disc.

13. An internal combustion engine, utilizing continuously variable stratified air fuel vapor mixtures at intake, as described in claim 10;

wherein said atomizers within said cascade are pressure atomizing nozzles;

and further comprising connections from the discharge of said means for delivering liquid fuel to at least one and at least the first pressure atomizing nozzle in said series of said cascade;

and further wherein said means for delivering liquid fuel and said liquid transfer means deliver said liquid fuel at a high pressure to said pressure atomizing nozzles.

14. An internal combustion engine, utilizing continuously variable stratified air fuel vapor mixtures at intake, as described in claim 2;

wherein said means for directing and distributing the air into said vaporizer section directs said air so that said intake air flows into a plurality of separate channels and so that the air flow quantities crossing each liquid fuel motion path from each of said separate air channels are essentially the same;

and further comprising means for adjusting the distribution of air flow between said separate air channels.

15. An internal combustion engine, utilizing continuously variable stratified air fuel vapor mixtures at intake, as described in claim 14;

and further comprising means for linking said means for supplying and controlling the total flow of liquid fuel into said vaporizer section with said means for adjusting the distribution of air flow between said separate air channels, so that as fuel flow rate increases, a larger portion of the air flow is directed into those separate air channels which direct said air flow to the early portions of the motion paths of the moving liquid, and so that as fuel flow rate decreases, a smaller proportion of the air flow is directed into those separate air channels which direct said air flow to the early portions of the motion paths of the moving liquid.

16. An internal combustion engine, utilizing continuously variable stratified air fuel vapor mixtures at intake, as described in claim 3, 4, 5, 6, 7, 11, or 12;

wherein said vaporizer sections have a circular cross section in that plane essentially parallel to the liquid fuel motion paths, the center of said circular cross section being coincident with said spin axis of said spinning discs;

and further wherein said air fuel vapor mixture outlet of each of said vaporizer sections has a diameter exceeding about one-fifth of the maximum diameter of said circular cross section of said vaporizer section but not exceeding the maximum diameter of said circular cross section of said vaporizer section.

17. An internal combustion engine, utilizing continuously variable stratified air fuel vapor mixtures at intake, as described in claim 3, 4, 5, 6, 7, 11, or 12;

wherein said vaporizer sections have a circular cross section in that plane essentially parallel to the liquid fuel motion paths, the center of said circular cross section being coincident with said spin axis of said spinning discs;

and further wherein said air fuel vapor mixture outlet of each of said vaporizer sections has a diameter exceeding about one-fifth of the maximum diameter of said circular cross section of said vaporizer section but not exceeding the maximum diameter of said circular cross section of said vaporizer section;

and further comprising;

means for adjusting the diameter of said air fuel mixture outlet of each of said vaporizer sections;

means for controlling said means for adjusting the diameter of said air fuel mixture outlets so that said diameter increases as total fuel flow per engine revolution decreases and so that said diameter decreases as total fuel flow per engine revolution increases.

18. An internal combustion engine, utilizing continuously variable stratified air fuel vapor mixtures at intake, as described in claim 2;

wherein said means for connecting said air fuel mixture outlet of each of said vaporizer sections to the intake pipes of a group of engine cylinders further comprises a number of regional stratifier elements equal to the number of said vaporizer sections, each of said regional stratifiers being located between the air fuel mixture outlet of one of said vaporizer sections and said intake pipes of said group of connected engine cylinders, each of said regional stratifier elements comprising;

an outlet connected to said intake pipes of said group of connected engine cylinders;

at least three separated inlet channels;

means for connecting each of said separated inlet channels to an area portion of said air fuel mixture outlet of said vaporizer section so that, each of said area portions is a different portion of said air fuel mixture outlet than all of the other said area portions, the sum of all said area portions equalling and being coincident with the area of said air fuel mixture outlet;

means for making a batch of separate connectings between said separated inlet channels of said regional stratifier and said outlet of said regional stratifier, so that said batch of connectings contains a number of connectings at least equal to the number of said separated inlet channels, said batch of connectings has at least one sequence of groups of connectings, each such group of connectings in said sequence of groups of connectings containing at least one connecting, each such group of connectings in said sequence of groups of connectings differing at least from the preceding group of connectings in said sequence, each such group of connectings in said sequence of groups of connectings which has adjacent connectings shall have at least one pair of said adjacent connectings differing, each of said differing connectings, within said batch of connectings, which is connected into the outlet of said regional stratifier for all groups of connectings in a full sequence of groups of connectings, shall make, at least once, within said full sequence and the starting of the next full sequence, non-adjacent connectings into the outlet of said regional stratifier which occur one immediately after the other into at least two successive groups of connectings, said non-adjacent connectings being non-adjacent as between successive groups of connectings, said batch of separate connectings being made once during each intake process of said group of connected engine cylinders.

19. An internal combustion engine, utilizing continuously variable stratified air fuel vapor mixtures at intake, as described in claim 2;

wherein said means for connecting said air fuel mixture outlet of each of said vaporizer sections to the intake pipes of a group of engine cylinders further comprises a number of regional stratifier elements equal to the number of said vaporizer sections, each of said regional stratifiers being located between the air fuel mixture outlet of one of said vaporizer sections and said intake pipes of said group of connected engine cylinders, each of said regional stratifier elements comprising;

an outlet connected to said intake pipes of said group of connected engine cylinders;

at least three separated inlet channels;

means for connecting each of said separated inlet channels to an area portion of said air fuel mixture outlet of said vaporizer section so that, each of said area portions is a different portion of said air fuel mixture outlet than all of the other said area portions, the sum of all said area portions equalling and being coincident with the area of said air fuel mixture outlet;

means for making a batch of separate connectings between said separated inlet channels of said regional stratifier and said outlet of said regional stratifier, so that said batch of connectings contains a number of differing connectings equal to the number of said separated inlet channels, said batch of connectings has at least one sequence of groups of connectings, all groups of connectings in said sequence of groups of connectings containing the same number of connectings equal to an integer greater than zero multiplied by the number of differing connectings within said batch of connectings, each of said differing connectings, within said batch of connectings is connected into the outlet of said regional stratifier for all groups of connectings in a full sequence of groups of connectings, and shall make, within said full sequence and the starting of the next full sequence, non-adjacent connectings into the outlet of said regional stratifier which occur one immediately after the other into all pairs of successive groups of connectings, said non-adjacent connectings being non-adjacent as between successive groups of connectings, each such group of connectings in said sequence of groups of connectings differing from all the other groups of connectings in said sequence, all adjacent connectings in each group of connectings in a full sequence of groups of connectings shall differ, each group of connectings in a full sequence of groups of connectings, which has adjacent connectings, shall have all such adjacent connectings differing, said batch of separate connectings being made once during each intake process of said group of connected engine cylinders.

20. An internal combustion engine, utilizing continuously variable stratified air fuel vapor mixtures at intake, as described in claim 2;

and further comprising means for increasing the temperature of air entering said vaporizer section inlet.

21. An internal combustion engine, utilizing continuously variable stratified air fuel vapor mixtures at intake, as described in claim 14 or 15;

and further comprising means for increasing the temperature of the air flowing in at least one of said separate air channels.

22. An internal combustion engine, utilizing continuously variable stratified air fuel vapor mixtures at intake, as described in claim 2;

and further comprising means for collecting unevaporated liquid at the end of those liquid fuel motion paths not equipped with a droplet catcher and returning said collected liquid to the fuel tank.

23. An internal combustion engine, utilizing continuously variable stratified air fuel vapor mixtures at intake, as described in claim 3, 4, 5, 6, 7, 11, or 12;
wherein said means for driving the spinning discs of said spinning disc atomizers maintains a high disc speed whenever the engine is running and whenever the engine is being started.

* * *